United States Patent
Ribeiro Pereira et al.

(10) Patent No.: US 11,080,776 B2
(45) Date of Patent: Aug. 3, 2021

(54) METHODS, SYSTEMS, AND COMPUTER READABLE MEDIA FOR PREDICTING RATINGS USING GRAPH FILTERS

(71) Applicant: The Trustees of the University of Pennsylvania, Philadelphia, PA (US)

(72) Inventors: Alejandro Rafael Ribeiro Pereira, Wynnewood, PA (US); Weiyu Huang, Philadelphia, PA (US); Antonio Garcia Marques, Madrid (ES)

(73) Assignees: THE TRUSTEES OF THE UNIVERSITY OF PENNSYLVANIA, Philadelphia, PA (US); UNIVERSIDAD REY JUAN CARLOS, Mostoles (ES)

( * ) Notice: Subject to any disclaimer, the term of this patent is extended or adjusted under 35 U.S.C. 154(b) by 0 days.

(21) Appl. No.: 16/115,177

(22) Filed: Aug. 28, 2018

(65) Prior Publication Data

US 2019/0066187 A1 Feb. 28, 2019

Related U.S. Application Data

(60) Provisional application No. 62/550,971, filed on Aug. 28, 2017.

(51) Int. Cl.
  *G06Q 30/06* (2012.01)
  *G06N 5/02* (2006.01)
  (Continued)

(52) U.S. Cl.
  CPC ......... *G06Q 30/0631* (2013.01); *G06N 5/022* (2013.01); *G06N 20/00* (2019.01); *G06Q 30/0201* (2013.01)

(58) Field of Classification Search
  CPC ....... G06Q 30/02; G06Q 30/051–0277; G06Q 30/06; G06Q 30/0601–0643;
  (Continued)

(56) References Cited

U.S. PATENT DOCUMENTS 6,487,541 B1 * 11/2002 Aggarwal .............. G06Q 30/02
  705/14.4
10,290,040 B1 * 5/2019 Misra ..................... G06N 3/088
  (Continued)

OTHER PUBLICATIONS

Segarra et al., "Optimal Graph-Filter Design and Applications to Distributed Linear Network Operators," IEEE Transactions on Signal Processing, vol. 65, No. 15, pp. 4117-4131 (Aug. 1 2017).
(Continued)

*Primary Examiner* — William J Allen
(74) *Attorney, Agent, or Firm* — Jenkins, Wilson, Taylor & Hunt. P.A.

(57) ABSTRACT

Methods, systems, and computer readable media for computing user rating predictions are disclosed. In some examples, a recommender is implemented on at least one processor and memory and programmed for receiving a request to select one or more recommended items for a user from unrated items that are unrated by the user to the recommender. The recommender is programmed for computing user rating predictions for each of the unrated items by applying a graph filter to user-item rating data. The user-item rating data includes other-user ratings of the unrated items by other users and a same-user ratings of other items by the user. The recommender is programmed for selecting the one or more recommended items from the unrated items using the user rating predictions for the unrated items and outputting the recommended items in response to the request.

19 Claims, 7 Drawing Sheets

(51) Int. Cl.
G06N 20/00 (2019.01)
G06Q 30/02 (2012.01)
(58) Field of Classification Search
CPC ..... G06Q 30/08; G06Q 30/0251–0277; G06Q 30/0201–0202; G06Q 30/0631; G06N 5/00; G06N 5/02; G06N 5/022; G06N 20/00; G06N 20/10; G06N 20/20
See application file for complete search history.

(56) References Cited

U.S. PATENT DOCUMENTS

| | | | | |
|---|---|---|---|---|
| 2008/0126303 | A1* | 5/2008 | Park | G06F 16/735 |
| 2011/0302126 | A1* | 12/2011 | Sekino | G06N 20/00 706/52 |
| 2012/0102047 | A1* | 4/2012 | Bjork | G06Q 30/02 707/748 |
| 2016/0092576 | A1* | 3/2016 | Quercia | G06F 16/9535 707/734 |
| 2017/0161618 | A1* | 6/2017 | Swaminathan | G06F 16/23 |
| 2017/0221090 | A1* | 8/2017 | Li | G06Q 30/0244 |
| 2018/0027296 | A1* | 1/2018 | Lea | H04N 21/475 725/50 |
| 2018/0225372 | A1* | 8/2018 | Lecue | G06F 16/36 |
| 2019/0095961 | A1* | 3/2019 | Wu | G06Q 30/0254 |

OTHER PUBLICATIONS

Huang et al., "Collaborative Filtering via Graph Signal Processing," IEEE European Signal Processing Conference (EUSIPCO), pp. 1744-1748 (Aug. 2017).
Knyazev, "Signed Laplacian for Spectral Clustering Revisited," Mitsubishi Electric Research Laboratories, pp. 1-19 (Jan. 2017).
Huang et al., "Rating Prediction via Graph Signal Processing," IEEE Transactions on Signal Processing, vol. 66, No. 19, pp. 5066-5081 (Oct. 1, 2018).
Wang et al., "Local measurement and reconstruction for noisy bandlimited graph signals," Signal Processing, vol. 129, pp. 119-129 (Dec. 2016).
Medaglia et al., "Functional Alignment with Anatomical Networks is Associated with Cognitive Flexibility," arXiv:1611.08751v1, pp. 1-38 (Nov. 2016).
Huang et al., "Graph Frequency Analysis of Brain Signals," IEEE Journal of Selected Topics in Signal Processing, vol. 10, No. 7, pp. 1189-1203 (Oct. 2016).
Liu et al., "Simultaneous Low-Rank Component and Graph Estimation for High-Dimensional Graph Signals: Application to Brain Imaging," IEEE International Conference on Acoustics, Speech and Signal Processing (ICASSP), arXiv:1609.08221, pp. 1-5 (Sep. 2016).
Rabbat et al., "Graph Laplacian Distributed Particle Filtering," IEEE European Signal Processing Conference (EUSIPCO), pp. 1493-1497 (Aug. 2016).
Tremblay et al., "Subgraph-Based Filterbanks for Graph Signals," IEEE Transactions on Signal Processing, vol. 64, No. 15, pp. 3827-3840 (Aug. 1, 2016).
Perraudin et al., "Towards stationary time-vertex signal processing," IEEE International Conference on Acoustics, Speech and Signal Processing (ICASSP), arXiv:1606.06962v1, pp. 1-7 (Jun. 2016).
Thanou et al., "Graph-Based Compression of Dynamic 3D Point Cloud Sequences," IEEE Transactions on Image Processing, vol. 25, No. 4, pp. 1765-1778 (Apr. 2016).
Pang et al., "Graph Laplacian Regularization for Inverse Imaging: Analysis in the Continuous Domain," arXiv:1604.07948, pp. 1-13 (Apr. 2016).
Marques et al., "Sampling of Graph Signals with Successive Local Aggregations," IEEE Transactions on Signal Processing, vol. 64, No. 7, pp. 1832-1843 (Apr. 1, 2016).
Varshney, "Bottleneck Capacity of Random Graphs for Connectomics," IEEE International Conference on Acoustics, Speech and Signal Processing (ICASSP), pp. 6305-6309 (Mar. 2016).
Ma et al., "Diffusion Filtering of Graph Signals and its Use in Recommendation Systems," IEEE International Conference on Acoustics, Speech and Signal Processing (ICASSP), pp. 4563-4567 (Mar. 2016).
Chen et al., "Discrete Signal Processing on Graphs: Sampling Theory," IEEE Transactions on Signal Processing, vol. 63, No. 24, pp. 6510-6523 (Dec. 15, 2015).
Velasco-Forero et al., "Nonlinear Operators on Graphs via Stacks," International Conference on Geometric Science of Information, pp. 654-663 (Oct. 2015).
Segarra et al., "Interpolation of Graph Signals using Shift-Invariant Graph Filters," IEEE European Signal Processing Conference (EUSIPCO), pp. 210-214 (Aug. 2015).
Pasdeloup et al., "Toward an Uncertainty Principle for Weighted Graphs," 23rd European Signal Processing Conference (EUSIPCO), pp. 1511-1515 (2015).
Kheradmand et al., "A General Framework for Regularized, Similarity-Based Image Restoration," IEEE Transactions on Image Processing, vol. 23, No. 12, pp. 5136-5151 (Dec. 2014).
Kalofolias et al., "Matrix Completion on Graphs," arXiv:1408.1717, pp. 1-10 (Aug. 2014).
Sandryhaila et al., "Discrete Signal Processing on Graphs: Frequency Analysis," IEEE Transactions on Signal Processing, vol. 62, No. 12, pp. 3042-3054 (Jun. 2014).
Wang et al., "A Graph-Based Joint Bilateral Approach for Depth Enhancement," IEEE International Conference on Acoustics, Speech and Signal Processing (ICASSP), pp. 885-889 (May 2014).
Sandryhaila et al., "Big Data Analysis with Signal Processing on Graphs," Computer Science, pp. 1-10 (2014).
Sandryhaila et al., "Discrete Signal Processing on Graphs," IEEE Transactions on Signal Processing, vol. 61, No. 7, pp. 1644-1656 (Apr. 1, 2013).
Shuman et al., "The Emerging Field of Signal Processing on Graphs: Extending High-Dimensional Data Analysis to Networks and Other Irregular Domains," IEEE Signal Processing Magazine, vol. 30, No. 3, pp. 1-14 (Mar. 2013).
Koren et al., "Matrix Factorization Techniques for Recommender Systems," Computer, vol. 42, No. 8, pp. 42-49 (Aug. 2009).
Duarte-Carvajalino et al., "Learning to Sense Sparse Signals: Simultaneous Sensing Matrix and Sparsifying Dictionary Optimization," IEEE Transactions on Image Processing, vol. 18, No. 7, pp. 1395-1408 (Jul. 2009).
Candès et al., "Exact Matrix Completion via Convex Optimization," Foundations of Computational Mathematics, vol. 9, No. 6, pp. 714-772 (2009).
Kim et al., "An Interior-Point Method for Large-Scale $l_1$-Regularized Least Squares," IEEE Journal of Selected Topics in Signal Processing, vol. 1, No. 4, pp. 606-617 (Dec. 2007).
Sarwar et al., "Recommender Systems for Large-scale E-Commerce: Scalable Neighborhood Formation Using Clustering," Proceedings of the 5th International Conference on Computer Information Technology, vol. 1, pp. 1-6 (Dec. 2002).
Sarwar et al., "Item-Based Collaborative Filtering Recommendation Algorithms," Proceedings of the 10th International Conference World Wide Web, pp. 285-295 (Apr. 2001).
Herlocker et al., "An Algorithmic Framework for Performing Collaborative Filtering," Proceedings of the International ACM SIGIR Conference on Research and Development in Information Retrieval, pp. 230-237 (Aug. 1999).
Resnick et al., "GroupLens: An Open Architecture for Collaborative Filtering of NetNews," Proceedings of the ACM Conference on Computer Supported Cooperative Work, pp. 175-186 (Oct. 1994).

* cited by examiner

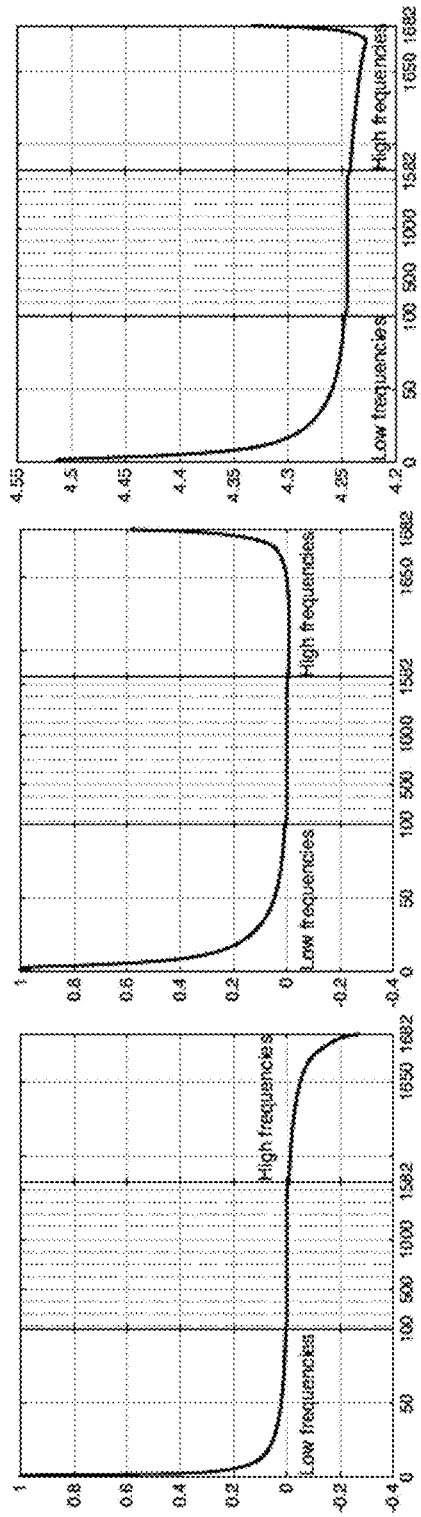
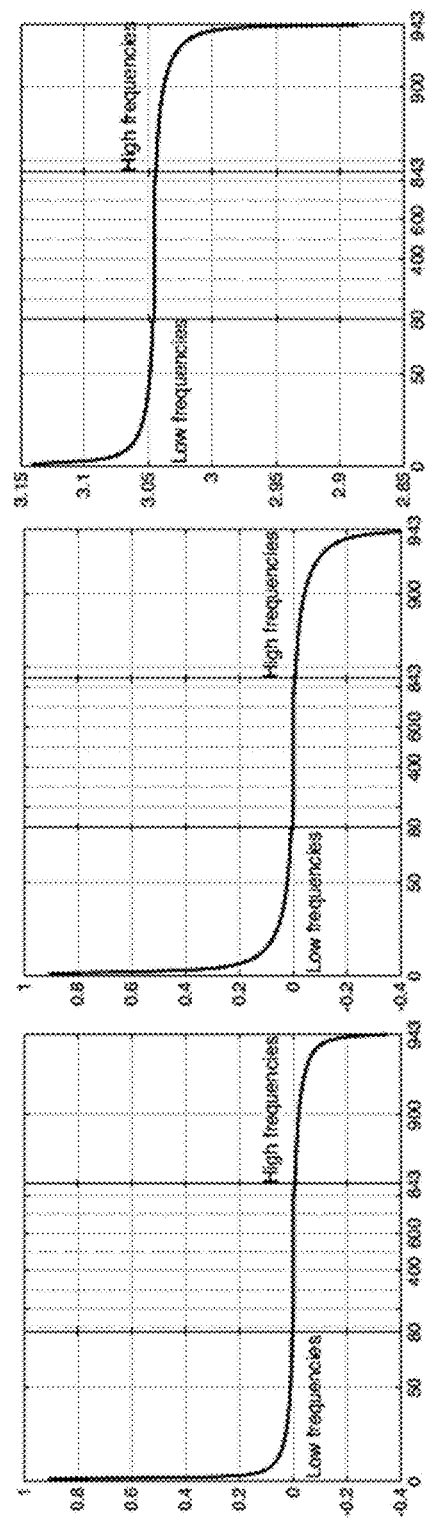
FIG. 5A  FIG. 5B  FIG. 5C
FIG. 5D  FIG. 5E  FIG. 5F

METHODS, SYSTEMS, AND COMPUTER READABLE MEDIA FOR PREDICTING RATINGS USING GRAPH FILTERS

PRIORITY CLAIM

This application claims the benefit of U.S. Provisional Patent Application Ser. No. 62/550,971 filed Aug. 28, 2017, the disclosure of which is incorporated herein by reference in its entirety.

TECHNICAL FIELD

The subject matter described herein relates to computing user rating predictions. More specifically, the subject matter relates to methods, systems, and computer readable media for determining recommendations for users by computing user rating predictions using graph filters.

BACKGROUND

The widespread deployment of the Internet technologies has generated a massive enrollment of online customers in web services, propelling the need for implementation of recommender systems (RS) to assist customers in making decisions. In a succinct way, RS are algorithms that collect information about how users of a particular service rate different items. The collected information is then exploited, along with additional sources of exogenous information, to provide customers with recommendations for the unrated items. Research on RS includes the so-called content filtering approach, which starts by defining a set of features that characterize users and items and then uses those to perform predictions on the unrated items. It also includes the collaborative filtering (CoFi) approach, which relies mostly on past user behavior and carries out predictions without defining an a priori set of features. Existing recommender systems may consume large amounts of computing resources and provide recommendations that fail to account for some kinds of available information Accordingly, there exists a need for methods, systems, and computer readable media for computing user rating predictions.

SUMMARY

Methods, systems, and computer readable media for computing user rating predictions are disclosed. A system for computing user rating predictions includes at least one processor, memory storing executable instructions for the at least one processor, and a recommender implemented on the at least one processor and memory. The recommender is programmed for receiving a request to select one or more recommended items for a user from unrated items that are unrated by the user to the recommender. The recommender is programmed for computing user rating predictions for each of the unrated items by applying a graph filter to user-item rating data. The user-item rating data includes other-user ratings of the unrated items by other users and a same-user ratings of other items by the user. The recommender is programmed for selecting the one or more recommended items from the unrated items using the user rating predictions for the unrated items and outputting the recommended items in response to the request.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIGS. 5A-F show frequency response for the graph filters;

DETAILED DESCRIPTION

This specification describes methods, systems, and computer readable media for computing user rating predictions. In general, a rating prediction system considers ratings for a number of user-item pairs. The goal of the system is to predict unknown ratings from observed ratings. Specifically, based on the available information, the system builds two graphs, one representing similarity between different users, and the other denoting similarity between different items. The observed ratings can then be considered as graph signals on this pair of graphs. The predictions are obtained by passing the observed ratings through two graph band-stop filters on the respective graph, where the filters are constructed jointly from a data-driven approach to best explain the observed ratings. The system can also be used in other applications involving the estimation of data values represented by two-dimensional structures.

This specification describes: (i) the perspective to treat ratings as graph signals on a pair of graphs, (ii) the data-driven approach to design graph band-stop filters, (iii) the simultaneous utilization of graph-based information on both user and item domains, and (iv) the structure for the prediction system, which allows for consideration of interactions among users and items as well as high order interactions between chains of users and items with moderate computational complexity.

The rating prediction task can be used in many problems, including rating predictions in recommendation systems, targeted advertisements, quality assurance, as well as survey results inference. At relatively small data scale, the systems can be used to construct rating prediction systems (i) to predict missing value entries in a database, (ii) to infer complete rating entries from partial observations, and (iii) to rank the quality of a number of items from limited number of ratings. The system can be useful, e.g., to consulting, information systems, and technology solution firms, social networking startups, and government information centers. At relatively big data scale, the systems can be used to design large distributed rating prediction system, for the purpose (i) to predict ratings of users, (ii) to recommend services based on user preferences, and (iii) to conduct targeted advertisements.

Compared to some conventional systems, the rating prediction accuracy in the systems described in this specification is improved significantly. The graph interpretation enables the interaction between multiple user-item pairs to be utilized in rating prediction procedure, without much increase in computational complexity. Moreover, the fact that the system utilizes a pair of graph band-stop filters may enable the system to be readily adoptable to various technical environments, e.g., consulting, information systems, or technology solution firms.

Figure 1:
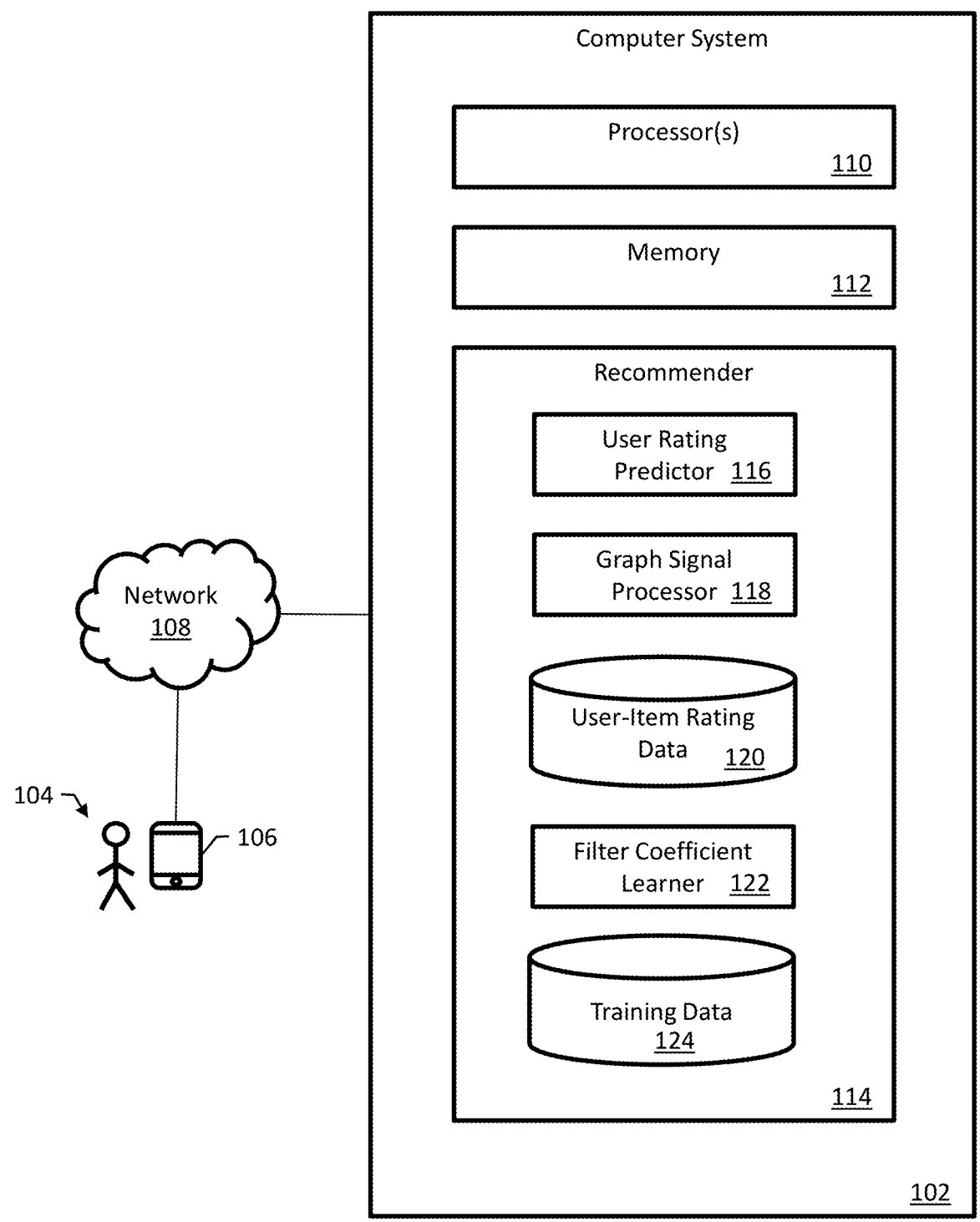
FIG. 1 is a block diagram of an example computer system for computing user rating predictions.

FIG. 1 is a block diagram of an example computer system 102 for computing user rating predictions. The system 102 can be a computer server, for example, programmed to output recommendations to a user 104 for display on a user device 106 by way of a data communications network 108. For example, the user device 106 can be a laptop, tablet, or mobile phone, and outputting recommendations can include displaying, on a display screen of the user device 106 to the user 104, a visual representation of each of a number of recommended items.

The system 102 can alternatively provide recommendations or user rating predictions to other computer systems or, in general, use the computed user rating predictions for any of various appropriate applications. For example, the system 102 can be used in the healthcare industry for, e.g., recommending drugs or doctors or both to users by predicting ratings of drugs or doctors by users. The system 102 can be used in education for recommending classes to users by predicting ratings of classes or professors by students, or by predicting grade point averages (GPAs) of students based on student schedules. The system 102 can be used in entertainment for recommending movies or other media to users by predicting ratings of users. The system 102 can be used in various other appropriate environments.

The system 102 includes at least one processor 110 and memory 112 storing executable instructions for the at least one processor 110. The system 102 includes a recommender 114 implemented using the at least one processor 110 and memory 112. The recommender 114 is programmed for receiving a request to select recommended items for the user 104, computing user rating predictions for unrated items, and outputting selected recommended items based on the user rating predictions in response to the request.

The recommender includes a user rating predictor 116, a graph signal processor 118, and user-item rating data 120. The user rating predictor 116 applies a graph signal processing (SP) graph filter of the graph signal processor 118 to the user-item rating data 120 to compute user rating predictions. The user-item rating data includes, e.g., other-user ratings of the unrated items by other users and a same-user ratings of other items by the user 104.

In some examples, the recommender 114 includes a filter coefficient learner 122. The filter coefficient learner 122 is programmed for determining filter coefficients for a graph SP graph filter from a training user-item dataset 124. The graph signal processor 118 can then use the learned filter coefficients to apply a graph filter to the user-item rating data 120.

Examples of rating prediction via graph signal processing are described further below with reference to FIGS. 3-8. Using graph signal processing in recommender systems is described further below following the section on rating prediction via graph signal processing. The system 102 can be programmed to use one or more of the methods described below. Using rating prediction via graph signal processing may result in reducing the computing overhead of the recommender 112. For example, the graph filter may have a relatively small number of coefficients, saving processing speed in processing the filter and memory; a similarity network may have a sparse network structure, saving processing speed in traversing the network and memory in storing the network, and the system may be implemented in a distributed computing system.

Figure 2:
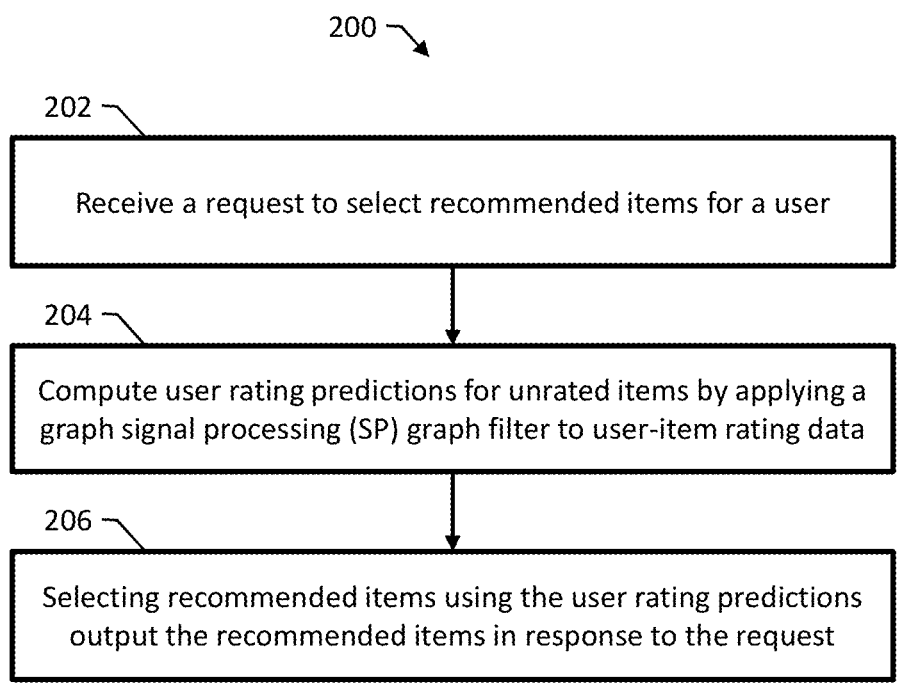
FIG. 2 is a flow diagram of an example method for computing user rating predictions.

FIG. 2 is a flow diagram of an example method 200 for computing user rating predictions. The method 200 is performed by a recommender implemented on at least one processor and memory storing executable instructions for the processor.

The method 200 includes receiving a request to select one or more recommended items for a user from unrated items that are unrated by the user to the recommender (202). For example, the user may execute a search query for items. In another example, the user may be browsing a website displaying some items, and a server of the website sends the request to display recommended items to the user.

The method 200 includes computing user rating predictions for each of the unrated items by applying a graph signal processing (SP) graph filter to user-item rating data (204). In some examples, computing user rating predictions includes constructing a similarity network from the user-item rating data. The similarity network can be a user similarity network including user similarity scores for each pair of users in the user-item rating data, or the similarity network can be an item similarity network including item similarity scores for each pair of items in the user-item rating data.

Applying the graph SP graph filter to the user-item rating data can include using the similarity network as a graph shift operator for the graph SP graph filter for aggregating information from a subset of the user-item rating data. For example, applying the graph SP graph filter can include applying a band-stop graph filter to the similarity network and the band-stop graph filter operates in a frequency domain of a spectrum of the user-item rating data. In some examples, the band-stop graph filter is a higher order graph filter including a plurality of filter coefficients selected so that computing user rating predictions accounts for one or more chains of users having determined similar ratings. In some examples, computing user rating predictions includes modelling a rating user-item function by identifying latent factors and characterizing the users and items in the user-item data using the latent factors.

The method includes 200 selecting the one or more recommended items from the unrated items using the user rating predictions for the unrated items and outputting the recommended items in response to the request (206). For example, selected the recommended items can include selecting items that have the highest user rating predictions.

Introduction to Rating Prediction Via Graph Signal Processing

Research on RS includes the so-called content filtering approach, which starts by defining a set of features that characterize users and items and then uses those to perform predictions on the unrated items [2], [3]. It also includes the collaborative filtering (CoFi) approach, which relies mostly on past user behavior and carries out predictions without defining an a priori set of features. Although CoFi comes with certain disadvantages (in particular when rating new products or users), it typically requires less assumptions than content filtering and yields a superior performance in real datasets [3]. As a result, it has emerged as the central approach for RS. Within this second approach, the two main techniques to design CoFi algorithms are latent linear factor models (LLFM) and nearest neighborhood methods (NNM). NNM, which work under the assumption that users who are similar tend to give similar ratings for the same product, proceed into two phases. Firstly, using a pre-specified similarity metric, a similarity score is computed for each pair of users. Secondly, the unknown ratings for a particular user are obtained by combining the ratings that similar users have given to the unrated items. To avoid over-fitting and simplify computations, only a subset of the users (the ones who are more similar and have rated the item) is considered [4]. A similar approach can be used to compute a similarity score among items, giving rise to the so-called item-based collaborative approaches. Differently, LLFM try to model the rating user-item function by identifying a number of latent factors. The main difference relative to content-filtering approaches is that here the factors are not defined a priori, but inferred from the available ratings. Although nonlinear latent factor models exist, the linear models based on matrix factorization (aka matrix completion methods [5]) combine tractability with good practical performance [3]. In particular, by arranging the available ratings in a matrix form with one of the dimensions corresponding to users and the other one to items, LLFM typically carry out low-rank singular value decomposition (SVD) that jointly maps users and items to latent factor linear space of reduced dimensionality [3]. The rating user-item function is then modeled simply as inner products in the reduced subspace defined by the SVD.

This specification describes new and more general recommendation schemes, but equally relevant unveils important connections between CoFi and graph SP. More precisely, we show that NNM can be viewed as algorithms that obtain the ratings by processing the available information with a graph filter. Moreover, matrix factorization methods can be reinterpreted as interpolation algorithms that, given a subset of signal observations (ratings), recover the full signal under the assumption that the ratings are bandlimited in a particular spectral domain. This interpretation not only provides a better understanding on the differences and similarities between both approaches, but it also opens the door to the design of more advanced algorithms leading to a better recommendation accuracy. In a nutshell, the contributions of this specification are: (a) To design and implement algorithms for more accurate and more efficient rating prediction systems, by integrating innovative ideas from graph SP with widely deployed algorithms in CoFi. (b) To illustrate how such rating prediction systems can be used to predict users' preferences about movies and music, from ratings they put into the system before. (c) To show how such rating prediction systems improve rating accuracy in the actual movie rating dataset (MovieLens 100k) and music rating dataset (YahooMusic) compared to commonly deployed algorithms.

Notation: Generically, the entries of a matrix X and a vector x will be denoted as Xij and xi; however, when contributing to avoid confusion, the alternative notation [X]ij and [x]i will be used. In general, x̃ denotes the frequency coefficients of x, while x̂ is the estimate of x. The notation $T^x$ stands for transpose; diag(X) applied to a matrix is a diagonal matrix satisfying [diag(X)]ii=[X]ii and zero for other entries; diag(x) applied to a vector is a diagonal matrix with [diag(x)]ii=[x]i and zero for other entries; $\lambda_{max}(X)$ is the largest eigenvalue of the symmetric matrix X; $\|X\|_*$ is the nuclear norm of X; $\|x\|_p$ is the p-norm of x; $\odot$ and $\otimes$ are, respectively, the Khatri-Rao and Kronecker product of two matrices; and $|\mathcal{X}|$ is the cardinality of the set X.

Figure 3:
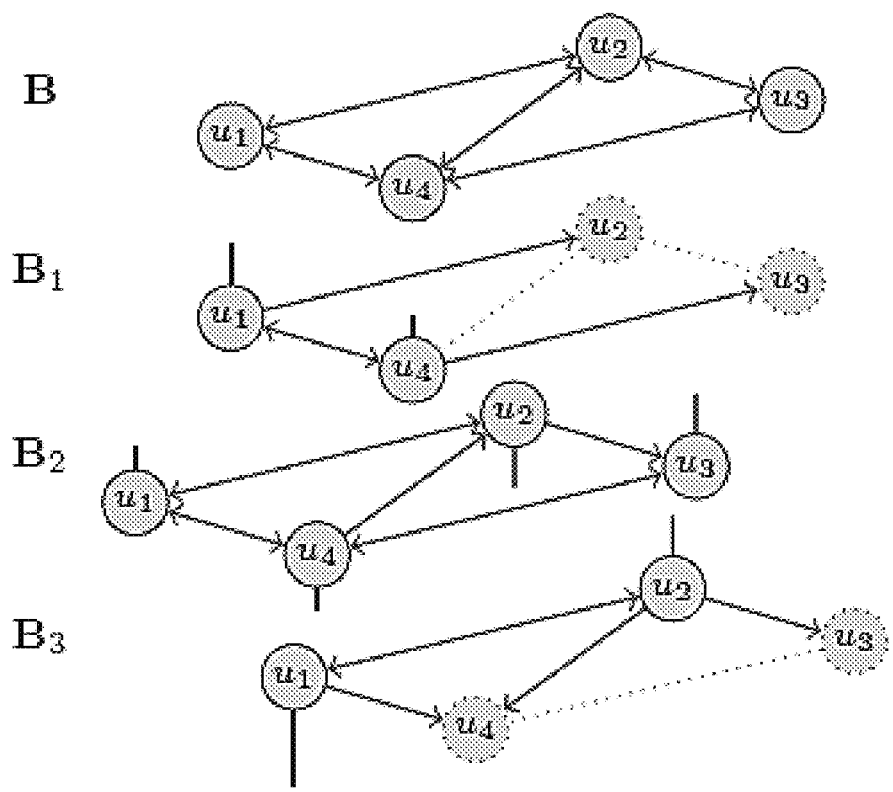
FIG. 3 illustrates viewing user-based CoFi as graph filters.

FIG. 3 illustrates viewing user-based CoFi as graph filters. The ratings for each item can be considered as graph signals on a network that depends on the specific item. For each specific item, edges starting from users who have not rate them are removed; e.g. edges from users u2 and u3 in network B1 and edges from users u3 and u4 in network B3 are removed. Then, given a specific user u, for all the edges coming into u, only the ones with the k-highest edge weights are kept; e.g. when k=2, in B2, the edge from u2 to u4 is removed because its weight is small compared to the edges from u3 to u4 and from u1 to u4. Proper normalizations are then applied to make each Bi right stochastic. The graph filter is a specific type of band-stop graph filter.

Figure 4:
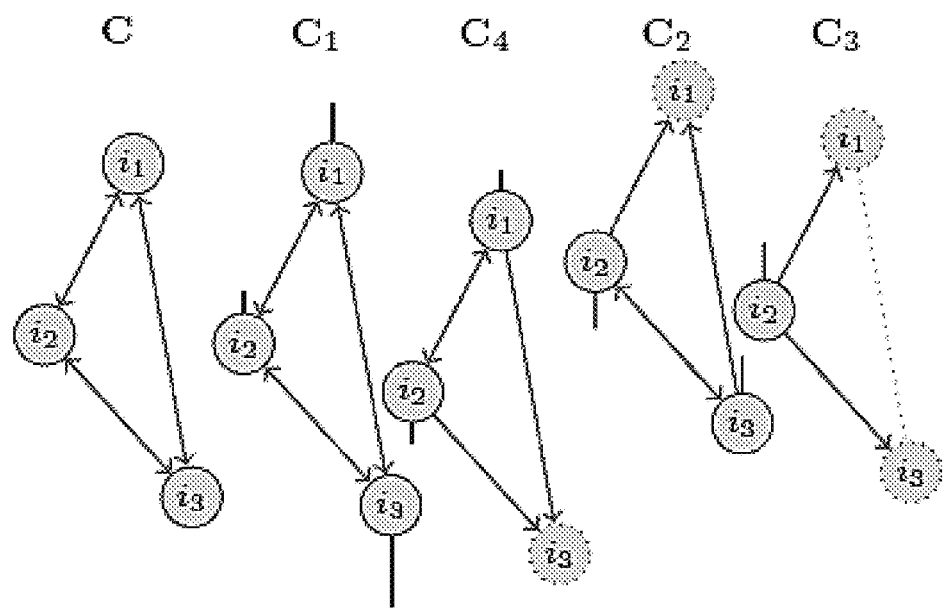
FIG. 4 illustrates viewing item-based CoFi as graph filters.

FIG. 4 illustrates viewing item-based CoFi as graph filters. As in FIG. 3, the ratings for each user can be considered as graph signals on a network that depends on the specific user. For each user, edges starting from items not rated by the user are removed; e.g. edges from item i3 in network C1 and edges from item i1 in network C2 are removed. Then, given a specific item i, for all the edges coming into i, only the ones with the k-highest edge weights are kept. Proper normalizations are then applied to make each Cu right stochastic.

FIGS. 5A-F show frequency response for the graph filters used in user-based filtering (FIGS. 5A-C) and used in item-based filtering (FIGS. 5D-F). In terms of user-based CoFi, for each Bi, we order its eigenvalues according to $|\lambda_l - \lambda_{max}|$ to denote high and low frequencies, and record the corresponding frequency response for low, middle, and high frequencies. The average behavior of such frequency response across all Bi is visualized. Frequency responses for item-based filtering are prepared similarly; for some Cu, its largest eigenvalue is less than 1 because the network is highly sparse. FIG. 5A shows a frequency response for user-based NNM; FIG. 5B shows a response for the best user-based filter trained on training set using user-based networks $\{B_i^l\}_{l=1}^6$; FIG. 5C shows a user-based frequency response in the best MiFi. FIG. 5D shows a frequency response for item-based NNM. FIG. 5E shows a response for the best item-based filter trained on training set using item-based networks $\{C_u^q\}_{q=1}^3$; FIG. 5F shows an item-based frequency response in the best MiFi.

Figure 6:
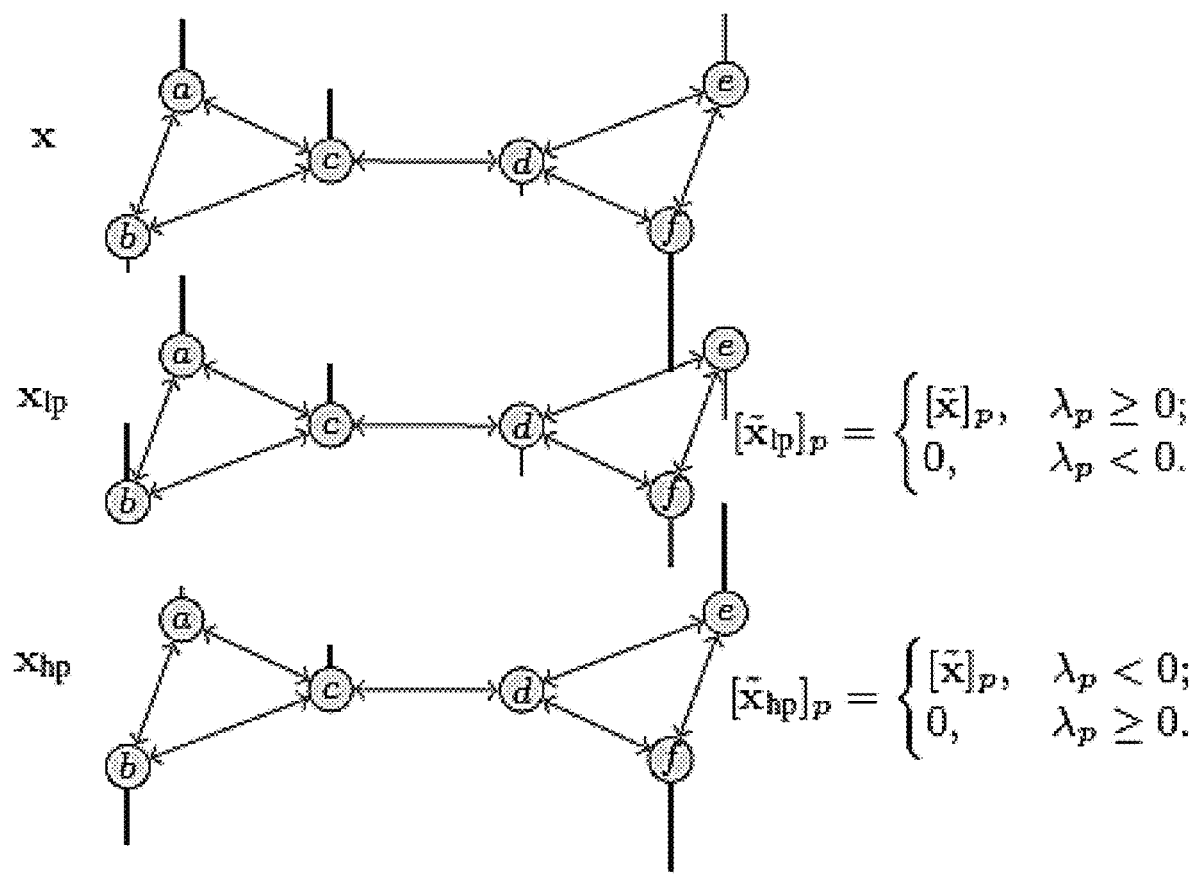
FIG. 6 shows low-pass and high-pass components of a rating signal.

FIG. 6 shows low-pass and high-pass components of a rating signal x. The low-pass components represent signals where similar users tend to have similar ratings, which provide the big picture for the rating profile. The high-pass component examines the differences between users with similar taste for the particular item, which can be considered as the boundary in rating profiles.

Figure 7A:
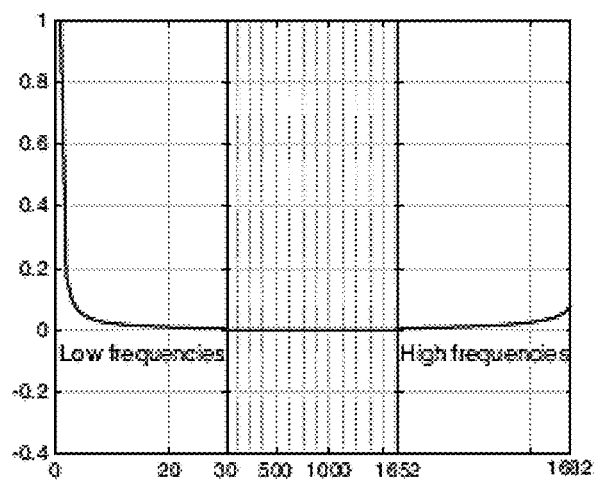
FIGS. 7A-B show a frequency response charts.
Figure 7B:
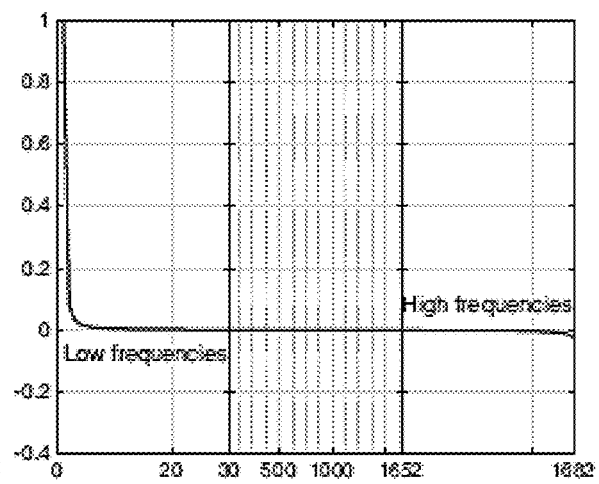

FIG. 7A shows a frequency response for the square $B_i^2$ of graph shifts, and FIG. 7B shows a frequency response for the cubic $B_i^3$, of shifts. For each Bi, we order its eigenvalues according to $|\lambda_j - 1|$ to denote high and low frequencies, and respectively record the frequency response $\lambda_j^2$ and $\lambda_j^3$ for low, middle, and high frequencies. The average behavior of such frequency response across all graph shifts is visualized.

Figure 8:
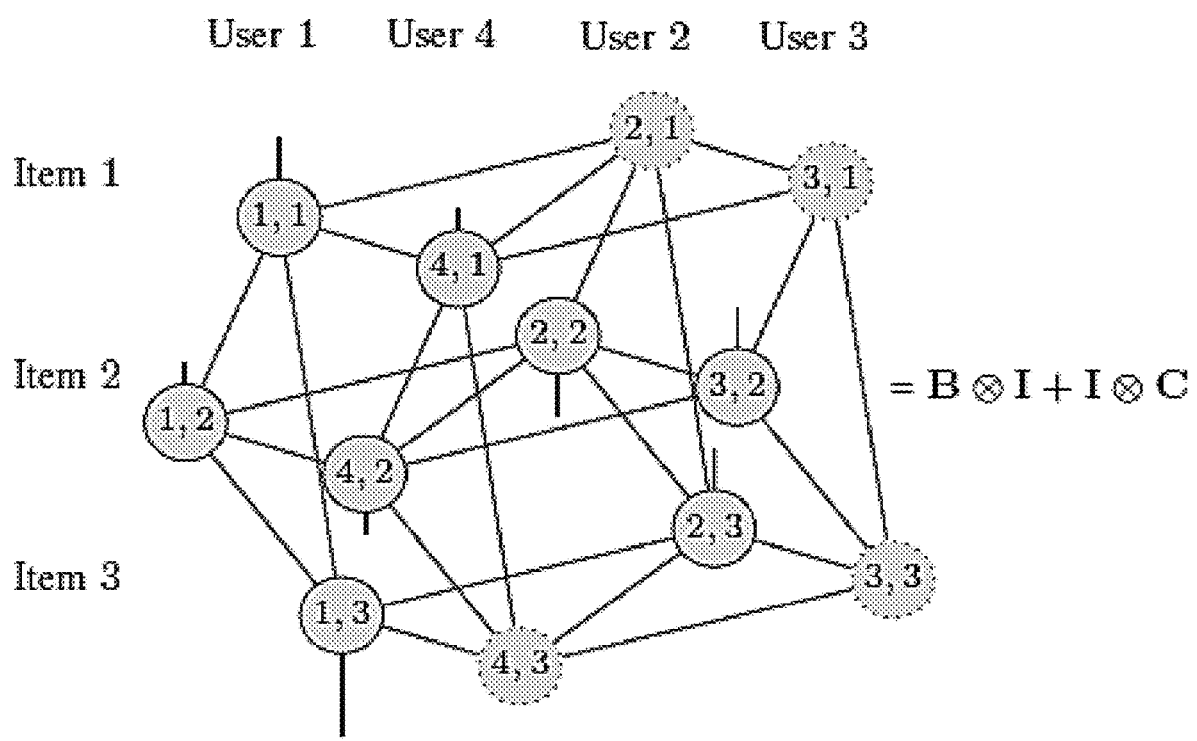
FIG. 8 illustrates viewing the entire rating matrix.

FIG. 8 illustrates viewing the entire rating matrix where the entry for Xu,i is represented as (u, i) as a graph signal on the product graph of correlation networks B and C. Rating prediction problem can be solved by using graph filters on the product graphs, or using cascade of graph filters H and G on the respective graphs.

Fundamentals of CoFi and Graph SP

We start by introducing the basic notation and formulating the CoFi problem. We then describe the NNM and LLFM methods. Finally, we review briefly the graph SP tools that will be used in the following sections.

Consider an RS setup with U users indexed by u, and I items indexed by i. The rating that user u has given to item i is represented as $X_{u,i}$. For mathematical convenience, such ratings can be collected either into the rating matrix $X \in \mathbb{R}^{U \times I}$, or into the rating vector $x = \text{vec}(X) \in \mathbb{R}^{UI}$. Additionally, vectors $x_u = [X_{u,1}, \ldots, X_{u,I}]^T \in \mathbb{R}^I$ and $x^i = [X_{1,i}, \ldots, X_{U,i}]^T \in \mathbb{R}^U$ represent the ratings by the u-th user and i-th item, respectively. To account for the fact that not all ratings are available, let S denote the set of indexes that identify user-item pairs whose ratings are known. Similarly, $S_u$ denotes a set containing the indexes of the items that user u has rated and $S_i$ denotes the indexes of the users who have rated item i. We then use $\bar{x}_S \in \mathbb{R}^{|S|}$ to denote a vector containing the known ratings. Similarly, $\hat{X}_{ui}$ will be used to denote that is a rating value which is actually known. With this notation, the problem of interest in this paper is stated as follows.

Problem 1 (CoFi)
Given the ratings $\bar{x}_S$ for the item-user pairs in S, estimate the full rating vector x (matrix X).

A. CoFi via NNM

As explained in the introduction, NNM builds on the assumption that if a pair of users u and v possess similar taste, then their ratings Xiu and Xiv for a particular item i are going to be similar as well. To formulate this rigorously, we start with user-based NNM, and let $B \in \mathbb{R}^{U \times U}$ be a matrix whose entry Buv denotes the similarity between the pair of users u and v. Given the particularities of a CoFi setup, Buv has to be computed using a metric that takes into account only the ratings available in $\bar{x}_S$. Define the set Suv as the intersection of Su and Sv, i.e., the set of items that have been rated by both u and v, a conventional choice to compute the similarity score is finding first the sample covariance as $$\sum_{uv}^{u} := \frac{1}{|S_{uv}|} \sum_{i \in S_{uv}} (\tilde{X}_{ui} - \mu_{uv})(\tilde{X}_{vi} - \mu_{uv}), \quad (1)$$

with $\mu_{uv} := \Sigma_{i \in S_{uv}} \bar{X}_{ui}/|S_{uv}|$. Note that the previous covariances and means are found using only the items that were commonly rated by u and v. The similarity score would then be found by simply setting $B_{uv} = \Sigma_{uv}^u$. In the context of RS, a more common approach is to use Pearson correlations [26], which normalizes the values in (1) and sets the similarity score to $$B_{uv} = [(\text{diag}(\Sigma^u))^{-1/2} \Sigma^u (\text{diag}(\Sigma^u))^{-1/2}]_{uv}, u \neq v, \quad (2)$$

and Buu=0. This definition yields symmetric scores Buv=Bvu and guarantees that the value of Buv lies between −1 and 1, with negative values indicating dissimilarities between u and v. Alternative choices for Buv include cosine similarity, adjusted cosine similarity [27], or the percentage of items rated by both u and v [24]. Note that the accuracy of the estimates in (2) depends on the value of $|S_{uv}|$ [cf. (1)]. Indeed, if $|S_{uv}|=1$, then Buv in (2) is always one regardless the actual ratings. To handle this, one can set Buv=0 for any pair of users such that $|S_{uv}|$ is smaller than a threshold $\underline{S}$.

The main idea behind NNM is that when predicting the rating Xui, only the ratings Xvi from users v that are very similar to u should be used. To do so, denote Kui as the set of k users who are the most similar to u (largest value of Buv) and have rated the item i. Note that, different from classical nearest neighbors algorithms in machine learning, for RS setups only users in (v,i)∈S are considered. As a result, the set of neighbors Kui depends on i and, if the number of users who rated i is small, $|\mathcal{K}_{ui}|$ can be less than k. Leveraging these definitions, the unknown ratings are finally predicted as $$\hat{X}_{ui} = \frac{\sum_{v \in \mathcal{K}_{ui}} B_{uv}(\tilde{X}_{vi} - \mu_v)}{\sum_{v \in \mathcal{K}_{ui}} B_{uv}} + \mu_{ui} \quad (3)$$

where $\mu_u := \Sigma_{i \in S_u} \bar{X}_{ui}/|S_u|$. At an intuitive level, the subtraction and addition of $\mu_v$ and $\mu_u$ account for the fact that some users may be more generous than others.

The user-based NNM exploits similarity between users to carry out rating predictions. Alternatively, one can define item-based NNM, which exploits similarity between items. Mimicking the steps followed before, define the set of users who have rated item i as Si and the set Sij as the intersection of Si and Sj. The matrix containing the item-based similarity scores is denoted as $C \in \mathbb{R}^{I \times I}$. To find the entries of C, the first step is to find the correlations across items as $$\sum_{ij}^{x} := \frac{1}{|S_{uv}|} \sum_{u \in S^{ij}} (\tilde{X}_{uj} - \mu^{ij})(\tilde{X}_{ui} - \mu^{ij}), \quad (4)$$

with $\mu^{ij} = \Sigma_{u \in S_{ij}} \bar{X}^{ui}/|S^{ij}|$. The values in (4) are then normalized to yield the similarity scores [cf. (2)]

$$C_{ij} = [(\text{diag}(\Sigma^{\tilde{x}}))^{-1/2} \Sigma^{\tilde{x}} (\text{diag}(\Sigma^{\tilde{x}}))^{-1/2}]_{ij}, i \neq j. \quad (5)$$

As in user-based CoFi, the score Cij is set to zero for i=j and for every pair of items where the number of users who rate both of i and j is smaller than a threshold $\underline{S}$. Finally, with Kiu denoting the set of k items which are the most similar to i and have been rated by user u, the unknown ratings can be predicted using the item similarity scores as $$\hat{X}_{ui} = \frac{\sum_{j \in \mathcal{K}^{iu}} C_{ij}(\tilde{X}_{uj} - \mu^j)}{\sum_{j \in \mathcal{K}^{iu}} C_{ij}} + \mu^i, \quad (6)$$

where $\mu^i := \Sigma_{u \in S^i} \bar{X}_{ui}/|S^i|$ is the average rating for item i.

B. CoFi via LLFM

Latent factor models try to approximate the rating user-item matrix by identifying a few latent features (factors) and then characterize both users and items in terms of those factors. In the linear case, this amounts to project the original user ratings xu and item ratings xi into a feature vector space of dimension F. The ratings are then obtained as inner products in such a space. Since in CoFi the features are not known a priori but learned from the data, the SVD decomposition plays a key role in identifying the latent factors as well as the underlying mapping. To be more specific, let us rely on the SVD factorization to write the rating matrix as $X = W \text{diag}(\sigma) Z^T$. Next, use the singular vectors to define $\tilde{x}_u = Z^T x_u$ as the feature profile of user u and $\tilde{x}^i = W^T x^i$ as the feature profile of item i. With these notational conventions, any rating Xu,i can be obtained as $X_{u,i} = \Sigma_{f=1}^F \sigma_f [\tilde{x}_u]_f [\tilde{x}^i]_f^T$, with the f-th singular value $\sigma_f$ representing the weight of factor f in explaining the rating. While the value of F is related to the rank of the rating matrix, in real scenarios one expects F to be small, so that X is (or it can be approximated as) a low-rank matrix.

Low-rank can be achieved by computing the SVD and keeping only the largest singular values. A major hurdle to implement this approach is that computation of the SVD requires full knowledge of X, but in the context of CoFi only the rating values in S are known. This implies that one must solve instead the problem of minimizing rank(X) subject to $X_{ij}=\tilde{X}_{ij}$, $\forall (u,i) \in S$. Since the rank function renders the problem non-convex, a widely used approach is to relax the rank using the nuclear-norm [5] and set $\hat{X}$ as the solution to $$\min_X \|X\|_* \quad (7)$$
$$\text{s.t.} \quad |X_{u,i} - \tilde{X}_{u,i}|^2 \leq \varepsilon_i \forall (u,i) \in S,$$

where a tolerance ε to account for potential observation noise in the known ratings has been included too. Note also that an additional advantage of (7) is that it can be easily augmented to incorporate additional sources of (a priori) information that one can have [23].

C. Graph SP

Consider a directed graph G with a set of N nodes or vertices N and a set of links E, such that if node n is connected to m, then $(n,m) \in \varepsilon$. The (incoming) neighborhood of n is defined as the set of nodes $\mathcal{N}_n = \{m | (m,n) \in \varepsilon\}$ connected to n. For any given graph we define the adjacency matrix A as a sparse N×N matrix with non-zero elements Am,n if and only if $(n,m) \in \varepsilon$. The value of Am,n captures the strength of the connection from n to m.

1) Graph signals and shift operator: The focus of graph SP is not on analyzing G, but graph signals defined on the set of nodes N. Formally, each of these signals can be represented as a vector $z=[z_1, \ldots, z_N]^T \in \mathbb{R}^N$ where the n-th element represents the value of the signal at node n. Since this vectorial representation does not convey explicitly the topology of G, the graph is endowed with a sparse graph-shift operator that captures the local structure of G. Typical choices for this shift operator are the adjacency matrix [7], [28], and the graph Laplacian [6]. To facilitate the connections with NNM, in this work we chose as shift the adjacency matrix A; however, our results can be easily generalized for other choices too. We assume henceforth that S is diagonalizable, so that $S=V\Lambda V^{-1}$ with $\Lambda=\text{diag}(\lambda) \in \mathbb{C}^{N \times N}$ being diagonal and $V=[v_1, v_2, \ldots, v_N]$. When S is symmetric we have that V is real and unitary, which implies $V^{-1}=V^T$. The intuition behind looking at S as an operator is to represent a transformation that can be computed locally at the nodes of the graph. More rigorously, if z' is defined as z'=Sz, then node n can compute z'n provided that it has access to the value of zm at $m \in \mathcal{N}_n$.

2) Graph Filters: Graph filters are a particular class of linear graph-signal operators that can be represented as matrix polynomials of the shift operator S [7]

$$H := \sum_{l=0}^{L-1} h_l S^l. \quad (8)$$

For a given input z, the output of the filter is simply z'=Hz. The filter coefficients are collected into $h:=[h_0, \ldots, h_{L-1}]^T$, with L denoting the filter degree. Graph filters are of particular interest because they represent linear transformations that can be implemented distributedly with L exchanges of information among neighbors [29].

3) Frequency representations: The eigendecomposition of S is used to define the frequency representation of graph signals and filters as stated next.

Definition 1

Consider a signal $z \in \mathbb{R}^N$ and a graph shift operator $S=V\Lambda V^{-1} \in \mathbb{R}$. Then, the vectors $$\tilde{z}=V^{-1}z \text{ and } z=V\tilde{z} \quad (9)$$

form a Graph Fourier Transform (GFT) pair [6], [7].

The GFT encodes a notion of variability for graph signals akin to one that the Fourier transform encodes for temporal signals [7], [28]. Specifically, the smaller the distance between $\lambda_p$ and $|\lambda_{max}(S)|$ in the complex spectrum, the lower the frequency it represents. This idea is based on defining the total variation of a graph signal z as $TV(z)=\|z-Sz/\lambda_{max}(S)\|_1$, with smoothness being associated to small values of TV. Then, given a $(\lambda_p, v_p)$ pair, one has that $TV(v_p)=\|1-\lambda_p/\lambda_{max}(S)\|_1 \|v_p\|_1$, which provides an intuitive way to order the different frequencies.

Definition 2

Consider a graph shift operator $S=V\Lambda V^{-1} \in \mathbb{R}^{N \times N}$, a graph filter $H=\sum_{l=0}^{L-1} h_l \Lambda^l$, and form the Vandermonde matrix $\Psi \in \mathbb{C}^{N \times L}$ with $\Psi_{p,i}=\lambda_p^{i-1}$. Then, the frequency response $h \in \mathbb{C}^N$ of the filter is $$H := V\text{diag}(\tilde{h})V^{-1} \text{ where } \tilde{h}=\Psi h \quad (10)$$

and $\Psi$ is the GFT for filter,

From the previous definitions is follows readily that if z'=Hz, then $\tilde{z}'=\text{diag}(\tilde{h})\tilde{z}$. In words, graph filters are orthogonal operators in the frequency domain.

CoFi from a Graph SP Perspective

In this section, we show that if the ratings x are viewed as a graph signal defined on particular user-to-user and item-to-item networks, then both NNM and LLFM predict signals $\hat{x}$ that are bandlimited in the frequency domain defined by those particular networks. That is, signals that can be expressed as a combination of few eigenvectors of the graph shift operator. This unified viewpoint provides a new understanding of traditional CoFi methods and allows us to develop more general algorithms with better prediction performance.

A. NNM as Graph Filters

The goal in this section is to show that the user-based (item-based) NNM methods presented in in Section II-A can be viewed as the application of a band-stop graph filter to an input rating signal. To be more precise, let us focus on the generation of $\hat{x}^i$, i.e., the predicted ratings for item i, using the ratings from other users and the similarities among them. The first step is to define the input graph signal, denoted by $x^i \in \mathbb{R}^U$, as $$[x^i]_u = \begin{cases} \tilde{X}_{ui} - \mu_u & \text{if } u \in S^i \\ 0 & \text{if } u \notin S^i \end{cases} \quad (11)$$

Since the bias has been removed, setting the unknown ratings to zero assigns a neutral preference for the item. The second step is to construct the user-similarity network, which will serve as graph shift operator. To this end, we start with the matrix B whose entries are given in (2) and recall that Bu,v=0 for any pair of users such that $|S_{uv}| \leq \tilde{S}$. Then, in order to account for the fact that ratings from users who do not rate i should not be considered when predicting i, we remove any edges starting from v if Xvi is unknown. This implies that the similarity network, which will be denoted as Bi, will depend on the particular item i. The final steps are to keep only the edges corresponding to the k most similar users and normalize each row so that the resultant matrix is left stochastic [cf. the denominator in (3)]. Mathematically, this implies that the matrix $B_i \in \mathbb{R}^{U \times U}$ is defined as $$[B_i]_{uv} = \begin{cases} B_{uv} / \sum_{v' \in \kappa_{u,i}} & \text{if } v \in \kappa_{u,i} \\ 0 & \text{if } v \notin \kappa_{u,i} \end{cases} \quad (12)$$

where we recall that Ku,i contains the k users that are the most similar to u and have rated item i. An example of this procedure using the MovieLens 100k dataset is illustrated in FIG. 3, where the top network represents the original B and the subsequent plots represent Bi for several items. For the case of the user-similarity network for item i=1, we observe that the edges starting from u2 and u3 that were present in B are absent in B1, because users u2 and u3 have not rated item i. In the case of B2 we observe that the edges (u2, u4) and (u3, u2) present in B have been removed because k=2 and their respective edge weight was small.

Once the graph signal xi and the graph shift-operator Bi are defined, the (unbiased) predicted ratings are simply given by $$\hat{x}_i = B_i x^i, \quad (13)$$

cf. (3). In words, the estimated ratings are obtained after applying the graph filter H=Bi of order one to the input signal $x^i$.

1) *Prediction in the frequency domain:* We now analyze the behavior of (13) in the frequency domain, to conclude that H=Bi acts a band-stop graph filter. Given a certain item i, consider the eigen-decomposition for the user-similarity network $S=B_i=V_i \Lambda V_i^{-1}$. Denote the GFT of the known input signal as $\tilde{x}^i = V_i^{-1} x^i$, and the GFT of the predicted rating as $\tilde{\hat{x}}i = V_i^{-1} \hat{x}^i$. The two GFTs are related via $$\tilde{\hat{x}}i = V_i^{-1} \hat{x}^i = V_i^{-1} B_i x^i = V_i^{-1} V_i \Theta V_i^{-1} (V_i \tilde{x}^i) = \Lambda \tilde{x}^i, \quad (14)$$

Therefore, the frequency response of the filter implementing NNM is $\text{diag}(\tilde{b}_i) = \text{diag}(\tilde{h}) = \Lambda$ and the p-th frequency coefficient of the predicted output is $[\tilde{\hat{x}}^i]_p = \lambda_p [\tilde{x}^i]_p$. Since the selection of the k nearest neighbors introduces some non-symmetries, $\lambda_p$ will also have a (small) imaginary part. Remember that $\lambda_{max}(B_i)$ is always 1 because of right stochasticity and that eigenvectors can be ordered according to TV($v_p$)=$|\lambda_p-1|$; see [28] and the related discussion after Definition 1. As a result smooth (low-frequency) eigenvectors are signals where $\|v_q - B_i v_q\| \approx 0$; i.e., full rating signals where users that are similar tend to agree.

To gain further intuition on the spectral behavior of (14), we examine the frequency response of Bi for the MovieLens 100k database. Specifically, for each Bi, we order its eigenvalues according $|\lambda_p-1|$, and record the frequency response $\tilde{b}_i$ for low, middle, and high frequencies. The I frequency responses obtained using this procedure are then averaged across i, giving rise to the single transfer function depicted in FIG. 5A. To help visualization, the scale in the horizontal axis is not homogeneous and only the real part of the eigenvalues is shown (the imaginary part is very small). The main finding is that the frequency response is zero for more than 90% of the frequencies, implying that the predicted signal will be graph bandlimited. Another observation of interest is that the frequencies not rejected by the filter and that are present in the predicted output are the ones associated with the first eigenvectors (low values of p) and the last eigenvectors (high values of p). The first eigenvectors represent signals of small total variation, while the last ones are associated with signals of high variation. Since the diagonal elements of each matrix Bi are zero, the sum of the eigenvalues is zero, with the eigenvalues associated with low frequencies being positive, and those associated with signals of large total variation being negative. To corroborate this, FIG. 6 shows the low-pass and high-pass components of a rating profile x. The low-pass components represent signals where similar users tend to have similar ratings, providing the big picture for the predicted rating. Differently, the high-pass component focuses on the differences between users with similar taste for the particular item. With this interpretation one can see (14) as a filter that eliminates the irrelevant features (middle frequencies), smooths out the similar components (low frequencies) and preserves the discriminative features (high frequencies). This band-stop behavior where both high and low graph frequencies are preserved is not uncommon in image processing (image de-noising and image sharpening, respectively) [30], and was observed in brain signal analytics as well [17], [18].

2) *Item-based NNM:* Following similar steps, item-based NNM can also be casted as a band-stop graph filter. In this case the input signal $x_u \in \mathbb{R}^I$ is defined as $[x_u]_i := \overline{X}_{ui} = \mu_i$ for every $i \in S_u$ and $[x_u]_i := 0$ otherwise. The graph shift operator for user u is found after setting to zero the entries in [C]ij corresponding to items not rated by user u and normalizing each of the rows; see FIG. 4. The prediction for user u generated by the item-based NNM in can be alternatively written as $\hat{x}_u = C_u x_u$. That is, a graph filter of order one with h0=0 and h1=1. After ordering the eigenvalues of Cu according to $|\lambda_p - \lambda_{max}(C_u)|$, it also holds now that has a band-stop frequency response, with eigenvectors associated with small $|\lambda_p|$ are rejected. To assess this behavior in real data, the frequency response of G=Cu (averaged across all u) is visualized in FIG. 5D. In the figure, the largest eigenvalue for some Cu is strictly less than 1 because the networks are highly sparse. We can generalize the idea in CoFi, and design other types of band stop filters with similar frequency response.

B. *LLFM as Searching Spares Frequency Coefficients*

Consider either the pre-processed rating matrix X or its centered version $X - \mu_u \mu_I / \mu$, where $$\mu_u = \frac{1}{I} X \mathbf{1}, \; \mu_u = \frac{1}{U} X^T \mathbf{1} \text{ and } \mu = \frac{1}{UI} \sum_{ui} X_{ui}.$$

The underlying idea behind LLFM is to model the ratings as a matrix $X = W \text{diag}(\sigma) Z^T$ with rank $F = \|\sigma\|_0$ small. The goal in this section is to interpret LLFM from a graph SP perspective, showing that predictions based on linear latent factors also give rise to bandlimited signals.

To that end, let us assume that X has been centered and consider the graph shift operators given by the user-to-user and item-to-item covariance matrices $$D = \frac{1}{I} XX^T \text{ and } E = \frac{1}{U} X^T X. \quad (15)$$

Since the shifts S=D and S=E are symmetric, they admit a normal eigen-decomposition as $$D = V\kappa_D V^T \text{ and } E = U\Lambda_E U^T. \quad (16)$$

For the shift S=D, the frequency representation of the ratings for a given item xi is therefore given by $\tilde{x}_i = V^T x^i$ and the matrix collecting the frequency representations for all item signals is $[\tilde{x}^1, \ldots, \tilde{x}^I] = V^T X$. Similarly, for S=E the frequency representation of xu is given by $\tilde{x}_i = U^T x_u$, with matrix $[\tilde{x}_1, \ldots, \tilde{x}_U] = U^T X^T$ collecting the frequency signal for all users. Notice that the two GFTs can be applied jointly, giving rise to the joint (two-dimensional) frequency representation of the user-item rating matrix as $$\tilde{X} = V^T X U. \quad (17)$$

The previous matrix can be vectorized to yield $$\tilde{x} = vec(V^T X U) = U^T \otimes V^T x. \quad (18)$$

The equation shows that if the ratings are expressed in the vector form x, the unitary matrix $U^T \otimes V^T$ represents the associated GFT. This also implies that one can view $x \in \mathbb{R}^{UI}$ as a signal defined on a shift $S \in \mathbb{R}^{UI \times UI}$ that has $U \otimes V$ as eigenvectors. Two natural choices for such a shift are $S = E \otimes D$, which is the Kronecker graph product graph of the two shifts in (15), and $S = E \otimes I + I \otimes D$, the Cartesian graph product of the shifts in (15). For further details on graph SP and product graphs, we refer readers to [31].

Since LLFM try to approximate the ratings matrix using the SVD factorization $X = W \text{diag}(\sigma) Z^T$ with $F = \|\sigma\|_0$ small, from the expressions in (15)-(17) it follows readily that:

(a) The eigenvectors of D and E are the singular vectors of X.
(b) The corresponding GFTs are $V^T = W^T$ and $U^T = Z^T$.
(c) The matrix collecting the frequency coefficients in (17) is $\tilde{X} = \text{diag}(\sigma)$.

Therefore, since $\tilde{X}$ is diagonal with rank F, vector $x \in \mathbb{R}^{UI}$ in (18) will have at most F non-zero entries, with F<<UI. In words, LLFM is essentially modeling the ratings x as a signal that is bandlimited in a frequency domain associated with the product graph of the covariance shifts given in (15).

From a practical point of view, it is important to know that since only the subset of ratings in S is known, unless a priori information exists, the covariance matrices in (15) cannot be computed beforehand. This implies that the LLFM formulation in (7) is searching jointly for a sparse $\tilde{x}$ as well as for the eigenvectors of the user-to-user and item-to-item covariance matrices.

Enhancing CoFi Via Graph SP

Using definitions and tools from graph SP, the previous section demonstrated that the rating predictions generated by either NNM or LLFM can be understood as signals that are sparse in a graph frequency domain. However, the particular graphs and the methods to make the predicted signal bandlimited are not the same. In particular, In particular,
User-based NNM utilizes shift as a heavily sparse user-similarity network that depends on the item to be predicted, while its item-based counterpart utilizes shift as a sparse item-similarity network that depends on the user to be predicted. Differently, LLFM uses shift as a larger similarity network given by the product graph of the user-to-user and item-to-item covariance matrices.

Regarding the particular methods to make the output bandlimited, NNM relies on a forward approach where the unknown ratings are set to zero and the resultant signal is processed with a band-stop graph filter of order one. On the other hand, LLFM uses an inverse approach where only a few values (samples) are available and the full rating matrix is recovered (interpolated) under the assumption of being bandlimited.

In this section, we illustrate how these interpretations can be leveraged to design novel graph-SP-based CoFi methods with enhanced prediction performance.

A. NNM: High order graph filters

As shown in Section III-A, the user-based NNM predicts the rating for item i via $\hat{x}^i = B_i x^i$, which can be modeled as the implementation of a band-stop graph filter of order one. Our proposal here is, using S=Bi as shift, to design other types of band-stop graph filters H(S) to perform rating predictions. Consider first $H = B_i^2$, whose frequency response is $\text{diag}(\tilde{h}) = \Lambda^2$. The fact of Bi being a band-stop filter implies that many of the entries of its frequency response $\tilde{h}_i$ are zero. As a result, $B_i^2$ has a band-stop behavior too and the same holds true for any positive power of Bi. FIG. 7A shows this for the filter $H = B_i^2$ and $H = B_i^2$ corresponding to the MovieLens 100k database. Since all powers of Bi are band-stop operators, the unknown ratings predicted with graph filters of the form $$\hat{x}^i = H x^i \text{ with } H = \sum_{l=0}^{L} h_l B_i^l, \quad (19)$$

will also give rise to bandlimited signals. Hence, predictions in (19) are generalizations of the traditional NNM in (13), which estimate $\hat{x}_i$ using a filter H=Bi of order one. This graph-frequency interpretation can be complemented by understanding the effect of Bi on the graph vertex domain. To do so, note that $B_i^0 x^i = x^i$ coincides with the original signal, $B_i x^i$ is an average of the ratings given by one-hop neighbors, $B_i^2 x^i$ is an average of elements in nodes that interact via intermediate common neighbors, and, in general, $B_i^l x^i$ describes interactions between l-hop neighbors. Therefore, on top of relying on the ratings of very similar users to make predictions, the powers of the matrix $B_i^l$ in the graph filter in (19) also account for chains of users with similar taste, exploiting them to generate enhanced predictions.

Compared to classical NNM, the filter coefficients h are not known a priori, and therefore need to be learned from a training set. Moreover, h0 is irrelevant since $B_i^0 x^i = x^i$ and therefore would not be helpful in predictions. Then, the filter coefficients are found by solving $$\min_h \sum_{(u,i) \in S} \left| \left[ \left( \sum_{l=1}^{L} h_l B_i^l \right) x^i \right]_u - \hat{x}_{u,i} \right|^2. \quad (20)$$

In practice, only the (u, i) pairs belonging to S would be considered in the optimization. To avoid overfitting, (20) can be augmented with a regularizer $$\min_{h} \sum_{(u,i)\in S} \left| \left[ \left( \sum_{l=1}^{L} h_l B_i^l \right) x^j \right]_u - \hat{X}_{u,i} \right|^2 + r\|h\|_2^2, \quad (21)$$

where r is a regularization parameter that can be tuned by cross-validation on the training set. Note that formulations in (20) and (21) are least squares problems that, using the Moore-Penrose pseudo inverse, admit "closed form" solutions. If the value of L is too large and a sparse vector of filter coefficients is desired, the regularizer $\|h\|_2^2$ can be either replaced or augmented with $\|h\|_1$.

Mimicking the previous steps, we can use the following generalized item-based NNM to predict user ratings $$\hat{x}_u = G x_u, \text{ with } G = \sum_{q=1}^{Q} g_q C_u^q. \quad (22)$$

The filter above has more degrees of freedom than its order-one counterpart described above, and accounts for chains of similar items to improve prediction accuracy. The vector of filter coefficients q is found by solving $$\min_{g} \sum_{(u,i)\in S} \left| \left[ \left( \sum_{q=1}^{Q} g_q C_u^q \right) x_u \right]_i - \hat{X}_{u,i} \right|^2 + r\|g\|_2^2. \quad (23)$$

in the training set.

B. NNM: Mirror Filter (MiFi)

The graph filter in (19) relies on chains of up to L users with similar taste to make a prediction for a certain item. The same holds true for the estimator in (22), which in this case exploits chains of items. Since the original CoFi (Problem 1) depends both on users and items, combining these two filters is a natural generalization. One can think of first passing the rating matrix X through a filter H on user-similarity and then passing the filtered rating matrix HX through another filter G on item-similarity to yield the final prediction $HXG^T$. We term such cascade of filters as Mirror Filter (MiFi). Note that the particular order in which the filters are applied is inconsequential, since matrix multiplication is associative. More formally, we propose MiFi as a generalized NNM where the predictions are obtained as $\hat{X}_{u,i} = [HXG^T]_{u,i}$, with $$H = \sum_{l=0}^{L} h_l B_i^l \text{ and } G = \sum_{q=0}^{Q} g_q C_u^q. \quad (24)$$

In contrast with the previous section, the filter coefficients h0 and g0 will play an important role in (24). The reason being that setting h0=g0=0 would force all the terms of the form $B_i^l X C_u^{qT}$ to depend on both Bi and Cu, preventing the possibility of having terms of the form $B_i^l X$ or $X(C_u^q)^T$. At an intuitive level, the MiFi uses ratings $\overline{X}_{v,j}$ to predict $\hat{X}_{u,i}$ if either evinces a path of similar users from v to u or a path or similar items from j to i. The cost is that more filter coefficients L+Q need to be found.

To that end, the training problem that yields the filter coefficients h and g is $$\min_{h,g} \sum_{(u,i)\in S} \left| \left[ \left( \sum_{l=0}^{L} h_l B_i^l \right) X \left( \sum_{q=0}^{Q} g_q C_u^q \right)^T \right]_{u,i} - \hat{X}_{u,i} \right|^2 + r(\|h\|_2^2 + \|g\|_2^2). \quad (25)$$

Preprocessing steps can also be applied to compute efficiently $B_i^l X C_u^q$ u for the user-item pairs (u, i) of interest and different orders l and q. The main difference with respect to the formulations in (21) and (23) is that the problem in (25) is bilinear on h and g. For a fixed h, (25) is a least squares problem on g, and the same holds true for a fixed g. Hence, a natural approach is to use a computationally efficient alternating least squares scheme to (approximately) solve (25). Initialization plays an important role for alternating least squares problems. Let h(0) be the optimal coefficients when g is set as g0=1 and gq=0 for q≠0; similarly, let g(0) be the optimal coefficients when h is set as h0=1 and h1=0 for l≠0. Our simulations show that using h(0) or g(0) as initial points, leads to solutions with good prediction performance.

An alternative to bypass the bilinearity on the filter coefficients is to reformulate (25) using the vectorial representation of the ratings. To this end, note first that $(\sum_{l=0}^{L} h_l B_i^l) X (\sum_{q=0}^{Q} g_q C_u^q)^T$ can be rewritten as $(\sum_{q=0}^{Q} g_q C_u^q) \otimes (\sum_{l=0}^{L} h_l B_i^l) x$. Defining now the Kronecker shift as $S_{ui} := C_u \otimes B_i$, it can be shown that our MiFi can be written as a graph filter on Sui and, hence, we can try to estimate filter coefficients $h^\otimes$ that minimize $$\min_{h^\otimes} \sum_{n\in S} \left| \left[ \left( \sum_{l=0}^{L^\otimes} h_l^\otimes S_{ui}^l \right) x \right]_n - \tilde{x}_n \right|^2 + r\|h^\otimes\|_2^2. \quad (26)$$

Not only the problem above is not bilinear, but it has a similar form as those described above. Note, however, that the number of coefficients $L^\otimes$ can be significantly larger than L+Q. Since the coefficients must be learned during the training phase, the increase in dimensionality can lead to problems related to estimation accuracy and overfitting. Simulations will corroborate this point for the MovieLens 100k database, showing that the predictor based on (25) enjoys a estimation performance superior to that of (26).

Remark 1 As done in classical NNM, we considered graph filters that use shift operators Bi and Cu. Such shifts have been adjusted according to the item and user of interest, and normalized to make them stochastic (normalization-then-filtering). Inspired by LLFM, a different generalization can be carried out by using the correlation matrices B and C as shifts, so that the prediction filters are $\Sigma_l h_l B^l$ and $\Sigma_q g_q C^q$. This would require performing adjustment and normalization after filtering (filtering-then-normalization). We focused on the first formulation because it is closer to the original setup considered in NNM and gives rise to better prediction accuracy. In any case, under minor modifications our algorithms can also handle the second formulation.

C. LLFM: Sampling Bandlimited Graph Signals

Section III-B revealed that, when interpreted from a graph SP perspective, LLFM builds on two fundamental assumptions: i) the rating signal x is bandlimited, and ii) x is defined on top of a graph which can be obtained by combining the user-to-user and item-to-item covariance matrices.

As a result, one can reinterpret the prediction carried out by an LLFM as a sampling and reconstruction problem (cf. Problem 1): given $\bar{x}_S$, our goal is to recover the full signal x; and the key assumption is that x is bandlimited and can be written as a linear combination of a few columns of U⊗V. To be rigorous, recall that x stands for the centered ratings, and (18) stated that $\tilde{X}=U^T\otimes V^T x$ and we have that $\tilde{x}=\text{vec}(X)=\text{vec}(\text{diag}(\sigma))$. Since only F of the singular values in σ are non-zero, the support of $\tilde{x}$ will have cardinality F and correspond to the F first diagonal elements of $\tilde{X}$. This readily implies that only F frequencies will be active, those corresponding to the Kronecker product of the f-th column of U with the f-th column of V. Using ⊙ to denote the Khatri-Rao product and $U_F$ to represent the F first columns of U, we then have $$x=(U_F\odot V_F)\tilde{x}_F, \text{ with } \tilde{x}_F\in\mathbb{R}^F. \quad (27)$$

If the eigenvectors are known, the procedure is clear [8], [32]: Given |S|≥F samples of x, invert (27) to estimate $\tilde{x}_F$, and then use the estimate $\hat{\tilde{x}}_F$ to recover the full rating signal as $\hat{x}=(U_F\odot V_F)\hat{\tilde{x}}_F$. Moreover, if $(U_F\odot V_F)_S$ denotes a submatrix of $U_F\odot V_F$ formed by the rows corresponding to the observed ratings, the least squares estimate of the frequency components is $\hat{\tilde{x}}_F=(U_F\odot V_F)_S^\dagger \bar{x}_S$ and the overall prediction becomes $$\hat{x}=U_F\odot V_F(U_F\odot V_F)_S^\dagger \bar{x}_S. \quad (28)$$

This interpretation is useful not only to come up with new reconstruction schemes, but also to apply results from sampling of graph signals to RS. For example, different papers have shown that when the number of observations is small, the set of sampled nodes plays a critical role on recovery performance [8], [32]. Consequently, schemes to select the nodes to be sampled have been developed [8]. This will amount to identifying user-item pairs that, if known, would contribute to increase the prediction performance. In this context, one can envision active sampling schemes where some users are exposed to particular items so that the overall prediction of the RS improves.

This interpretation can be leveraged to present different alternatives for LLFM. The main problem to implement is that the full covariances D and E in (15), which give rise to V and U, are not known. If the available ratings are uniformly distributed across users and items, a simple strategy is to replace the covariances in (15) with the approximations $\hat{\Sigma}^x$ and $\hat{\Sigma}^u$ presented in (1) and (4), which rely only on the ratings that are known. Let $\hat{V}$ and $\hat{U}$ represent the approximated eigenvectors, the recovery problem to solve in this case is
find $\tilde{x}_F$ $$\text{s.t. } |\bar{x}_n - [\hat{U}_F\odot\hat{V}_F\tilde{x}_F]_n|^2 \leq \varepsilon, \forall n\in S, \quad (29)$$

where the main difference is that the solution in the sampled set is not forced to coincide with the original observations.

Another interesting alternative is to enlarge the set of active frequencies both inside and outside the diagonal of $\tilde{X}$. Suppose first that the frequency support $F_s$ is small and known, the formulation is then
find $\tilde{x}$ $$\text{s.t. } |\bar{x}_n - [\hat{U}\otimes\hat{V}\tilde{x}]_n|^2 \leq \varepsilon, \forall n\in S, \quad (30)$$

$$\tilde{x}_f = 0, f\notin\mathcal{F},$$

and the predicted ratings are simply $\hat{x}=(\hat{U}\otimes\hat{V})\tilde{x}^*$, with $\tilde{x}^*$ being the solution to (30). If F is not known, a regularizer $\|\tilde{x}\|_0$ penalizing the number of nonzero coefficients can be added to the optimization. Since the $\ell_0$ norm is non-convex, the convex surrogate $\|\tilde{x}\|_1$ is used instead to yield $$\min_{\tilde{x}}\|\tilde{x}\|_1 \quad (31)$$

$$\text{s.t. } |\bar{x}_n - [\hat{U}\otimes\hat{V}\tilde{x}]_n|^2 \leq \varepsilon, \forall n\in S.$$

The above optimization is a classical sparse recovery problem whose performance depends on the number of observed ratings |S|, the tolerance ε, as well as on the properties (including coherence) of the so-called sensing matrix $\hat{U}\otimes\hat{V}$ [33].

The last algorithm in this section is inspired by NNM. While LLFM are implicitly considering the same user-to-user and item-to-item shifts for all the predictions, NNM use a different graph for each user and item. This can be incorporated to the current sampling setup. Suppose that the focus is on predicting $x_n=X_{ui}$. Then, let $V_i$ and $U_u$ be the eigenvectors of $B_i$ and $C_u$, respectively, and consider the problem [cf. (30)]
find $\hat{x}$ $$\text{s.t. } |\bar{x}_{n'}-[U_u\otimes V_i\tilde{x}]_{n'}|^2\leq\varepsilon, \forall n'\in S, \quad (32)$$

$$\tilde{x}_f=0, f\notin\mathcal{F},$$

The main difficulty with this approach is that (32) needs to be solved for every n not in S. On the positive side, since matrices $B_i$ and $C_u$ are very sparse and only a few of their eigenvectors are required (the ones associated with the largest eigenvalues), those eigenvectors can be found efficiently.

Summarizing, by reinterpreting LLFM as the recovery of a bandlimited graph signal from a subset of samples, a number of novel prediction algorithms have been described in this section. The algorithms proceed in two steps. First, the user-to-user and item-to-item networks are built and their eigenvectors are found. Second, using those eigenvectors as input, the prediction is formulated as a sparse recovery problem. The different algorithms correspond to different ways to build the similarity shifts as well as different formulations of the sparse recovery. In some examples, alternative definitions for the shifts and modifications in the sparse optimization can be used.

Conclusions to Rating Prediction Via Graph Signal Processing

This specification described the use of results from graph SP to propose new interpretations for RS methods. Our first contribution was to show that: a) CoFi can be considered as a specific band-stop graph filter operating on the network describing similarities between users or items; and b) LLFM is searching for the user-based and item-based networks that give the most bandlimited representation for the rating signals. Leveraging these novel interpretations, we then proposed three new methods for RS: (i) by using other types of graph band stop filters, (ii) through a combination of graph band stop filters on both the user and item networks (referred to as Mirror Filters (MiFi)), and (iii) by considering a graph signal sampling and reconstruction problem, and exploiting the eigenvectors of similarity matrices constructed from known ratings.

REFERENCES FOR RATING PREDICTION VIA GRAPH SIGNAL PROCESSING

The disclosure of each of the following references is hereby incorporated by reference in its entirety.
[1] W. Huang, A. G. Marques, and A. Ribeiro, "Collaborative filtering via graph signal processing," in IEEE European Signal Process. Conf. (EUSIPCO), Kos Island, Greece, August 2017, p. (invited).
[2] F. Ricci, L. Rokach, and B. Shapira, Introduction To Recommender Systems Handbook. Springer, 2011.
[3] Y. Koren, R. Bell, and C. Volinsky, "Matrix factorization techniques for recommender systems," Computer, vol. 42, no. 8, pp. 30-37, August 2009.
[4] B. M. Sarwar, G. Karypis, J. Konstan, and J. Riedl, "Recommender systems for large-scale e-commerce: Scalable neighborhood formation using clustering," in Proc. of the 5th Int. Conf. on Comput. Inf. Technol., vol. 1, December 2002.
[5] E. J. Cand'es and B. Recht, "Exact matrix completion via convex optimization," Found. Comput. Math., vol. 9, no. 6, pp. 717-772, June 2009.
[6] D. Shuman, S. Narang, P. Frossard, A. Ortega, and P. Vandergheynst, "The emerging field of signal processing on graphs: Extending high-dimensional data analysis to networks and other irregular domains," IEEE Signal Process. Magazine, vol. 30, no. 3, pp. 83-98, March 2013.
[7] A. Sandryhaila and J. Moura, "Discrete signal processing on graphs," IEEE Trans. Signal Process., vol. 61, no. 7, pp. 1644-1656, April 2013.
[8] A. G. Marques, S. Segarra, G. Leus, and A. Ribeiro, "Sampling of graph signals with successive local aggregations," IEEE Trans. Signal Process., vol. 64, no. 7, pp. 1832-1843, April 2016.
[9] M. Rabbat, M. Coates, and S. Blouin, "Graph laplacian distributed particle filtering," in IEEE European Signal Process. Conf. (EUSIPCO), August 2016, pp. 1493-1497.
[10] N. Perraudin, A. Loukas, F. Grassi, and P. Vandergheynst, "Towards stationary time-vertex signal processing," arXiv preprint arXiv:1606.06962, June 2016.
[11] N. Tremblay and P. Borgnat, "Subgraph-based filterbanks for graph signals," IEEE Trans. Signal Process., vol. 64, no. 15, pp. 3827-3840, August 2016.
[12] B. Pasdeloup, R. Alami, V. Gripon, and M. Rabbat, "Toward an uncertainty principle for weighted graphs," in IEEE European Signal Process. Conf. (EUSIPCO), August 2015, pp. 1496-1500.
[13] L. R. Varshney, "Bottleneck capacity of random graphs for connectomics," in IEEE Int. Conf. on Acoustics, Speech and Signal Process. (ICASSP), March 2016, pp. 6305-6309.
[14] S. Velasco-Forero and J. Angulo, "Nonlinear operators on graphs via stacks," in Springer Int. Conf. on Networked Geometric Sci. of Inf., October 2015, pp. 654-663.
[15] A. V. Knyazev, "Signed laplacian for spectral clustering revisited," arXiv preprint arXiv:1701.01394, January 2017.
[16] X. Wang, J. Chen, and Y. Gu, "Local measurement and reconstruction for noisy bandlimited graph signals," Elsevier Signal Process., vol. 129, pp. 119-129, December 2016.
[17] W. Huang, L. Goldsberry, N. F. Wymbs, S. T. Grafton, D. S. Bassett, and A. Ribeiro, "Graph frequency analysis of brain signals," IEEE J. Sel. Topics Signal Process., vol. 10, no. 7, pp. 1189-1203, October 2016.
[18] J. D. Medaglia et al., "Functional alignment with anatomical networks is associated with cognitive flexibility," arXiv preprint arXiv:1611.08751, November 2016.
[19] R. Liu, H. Nejati, and N.-M. Cheung, "Simultaneous low-rank component and graph estimation for high-dimensional graph signals: application to brain imaging," arXiv preprint arXiv:1609.08221, September 2016.
[20] J. Pang and G. Cheung, "Graph laplacian regularization for inverse imaging: Analysis in the continuous domain," arXiv preprint arXiv:1604.07948, April 2016.
[21] D. Thanou, P. A. Chou, and P. Frossard, "Graph-based compression of dynamic 3d point cloud sequences," IEEE Trans. Image Process., vol. 25, no. 4, pp. 1765-1778, April 2016.
[22] Y. Wang, A. Ortega, D. Tian, and A. Vetro, "A graph-based joint bilateral approach for depth enhancement," in IEEE Int. Conf. on Acoustics, Speech and Signal Process. (ICASSP), May 2014, pp. 885-889.
[23] V. Kalofolias, X. Bresson, M. Bronstein, and P. Vandergheynst, "Matrix completion on graphs," arXiv preprint arXiv: 1408.1717, August 2014.
[24] J. Ma, W. Huang, S. Segarra, and A. Ribeiro, "Diffusion filtering for graph signals and its use in recommendation systems," in IEEE Int. Conf. on Acoustics, Speech and Signal Process. (ICASSP), March 2016, pp. 4563-4567.
[25] P. Resnick, N. Iacovou, M. Suchak, P. Bergstrom, and J. Riedl, "Grouplens: an open architecture for collaborative filtering of netnews," in Proc. of the 1994 ACM Conf. on Comput. Supported Cooperative Work, October, 1994, pp. 175-186.
[26] J. L. Herlocker, J. A. Konstan, A. Borchers, and J. Riedl, "An algorithmic framework for performing collaborative filtering," in Proc. of the 22nd annual Int. ACM SIGIR Conf. on Research and Develop. in Inf. Retrieval, August 1999, pp. 230-237.
[27] B. Sarwar, G. Karypis, J. Konstan, and J. Riedl, "Item-based collaborative filtering recommendation algorithms," in ACM Proc. of the 10th Int. Conf. World Wide Web, April 2001, pp. 285-295.
[28] A. Sandryhaila and J. Moura, "Discrete signal processing on graphs: Frequency analysis," IEEE Trans. Signal Process., vol. 62, no. 12, pp. 3042-3054, June 2014.
[29] S. Segarra, A. G. Marques, G. Leus, and A. Ribeiro, "Interpolation of graph signals using shift-invariant graph filters," in IEEE European Signal Process. Conf. (EUSIPCO), Nice, France, August 2015.
[30] A. Kheradmand and P. Milanfar, "A general framework for regularized, similarity-based image restoration," IEEE Trans. Image Process., vol. 23, no. 12, pp. 5136-5151, December 2014.
[31] A. Sandryhaila and J. M. Moura, "Big data analysis with signal processing on graphs: Representation and processing of massive data sets with irregular structure," IEEE Signal Process. Magazine, vol. 31, no. 5, pp. 80-90, September 2014.
[32] S. Chen, R. Varma, A. Sandryhaila, and J. Kovaˇcevi´c, "Discrete signal processing on graphs: Sampling theory," IEEE Trans. Signal Process., vol. 63, no. 24, pp. 6510-6523, December 2015.
[33] J. M. Duarte-Carvajalino and G. Sapiro, "Learning to sense sparse signals: Simultaneous sensing matrix and sparsifying dictionary optimization," IEEE Trans. Image Process., vol. 18, no. 7, pp. 1395-1408, July 2009.

[34] S. Kim, K. Koh, M. Lustig, S. Boyd, and D. Gorinevsky, "A method for large-scale l1-regularised least squares problems with applications in signal processing and statistics," IEEE J. Select. Topics Signal Process, vol. 1, no. 4, pp. 606-617, December 2007.

Introduction to Collaborative Filtering Via Two Dimensional Graph Filters: Accurate Prediction with Reduced Complexity Recommender systems aim to predict unknown ratings by exploiting the information revealed in a subset of user-item observed ratings. Due to the fact that practical datasets contain millions of user-item pairs, collaborative filtering prediction methods such as k-nearest neighbors (NN) have been developed to reduce computational complexity at the cost of losing prediction accuracy. By leveraging notions of graph signal processing, NN methods can be shown equivalent to a very specific class of graph filter. More importantly, this analogy can be exploited to develop enhanced prediction methods that use more sophisticated graph filters. While such methods are still computationally efficient (only a linear penalty is paid relative to the complexity in NN methods), their prediction performance is noticeable better. The reason for this enhanced prediction performance is two-fold: a) two-dimensional similarities across users and items are exploited; and b) ratings from users and items beyond those considered in a NN method are considered.

Problem Statement

Consider a matrix of ratings $X \in \mathbb{R}^{U \times I}$. Columns represent items, rows represent users. Hence, the u-th row of X collects the ratings that user u gave to the set of items i=1, ..., I, while the i-th column collects the ratings that different users gave to item i.

In practical applications only one portion of the entries of the rating matrix X are known and the goal is to predict the unknown ratings from the known ones [1], [2]. For notational convenience we denote as $\overline{X} \in \mathbb{R}^{U \times I}$ a matrix with the same size than X and whose entry $\overline{X}_{u,i}$ is equal to Xu,i if the rating that user u gave to item i is known and $\overline{X}_{u,i}=0$ otherwise. In many applications of interest, both the number of users U and items I are on the order of a few thousands, so that the size of X is in the order of tens of millions. Out of those ratings, typically less than 5% are known [1], [2], so that the number of non-zero elements in $\overline{X}$ is in the order of millions.

A. Optimal Prediction

Suppose that we want to predict the rating Xi,u using the information in $\overline{X}$. The optimal procedure will be to find the correlation between Xi,u and the (millions) of non-zero entries in $\overline{X}$. This will have to be repeated for each of the unknown entries. Hence, the complexity per user-item pair will be in the order of UI (millions).

Reducing the Cost Via One-Dimensional Prediction

Since the optimal procedure described in the preceding paragraph is computationally costly, one option to reduce complexity is to focus only on the similarities across users. In this case, if we want to predict Xi,u then we first find how correlated is user u with all other users u'≠u. Then, during the online phase we use only the ratings that users u' gave to item i in order to predict Xi,u. This is less complex because then number of users U (thousands) is way less than the number of ratings UI (millions).

A. One-Dimensional Prediction Using Only Closest One-Hop Neighbors

To further reduce complexity (during the training phase and, especially, during the operational phase) we can consider only the $U_N$ users that are most similar to user u. In that case, instead of running a prediction using as input U−1 ratings, we will run it using only $U_N$. For the movie database U is in the order of thousands and $U_N$ is about 30, so that the resultant complexity is 97% smaller. This scheme corresponds to what in the literature is referred to as nearest-neighbors collaborative filtering. The complexity of this method is very low, but the price to pay is loss of prediction accuracy: only user similarity is taken into account and, on top of that, only a few users are considered.

1) Remark: One-Dimensional Item-Based Schemes

While the algorithm just described considered similarities among users, an alternative scheme can be built considering only the most similar items. This gives rise to nearest-neighbors (item-based) collaborative filtering. As before, complexity is very low, but the price to pay is loss of prediction accuracy since only item similarity is taken into account and a few items are considered.

Two-Dimensional Multi-Hop Neighborhood

Our two-dimensional graph filter approach preserves the idea of using a sparse structure that considers only the closest users and items but enhances the prediction procedure to try to overcome the loss of accuracy.

A. One-Dimensional Multi-Hop Neighborhoods

Let us define $B \in \mathbb{R}^{U \times U}$ as a matrix that takes into account similarities among users. We further assume that only the strongest similarities are considered, so that most entries in B are zero.

Let $\overline{x}^i$ be a signal that contains the ratings known for item i and suppose that we form the signal $x_{(1)}^i = B\overline{x}_i$. If we see (the rows of) B as a weighted averaging operator, the uth entry of $x_{(1)}^i$; represents the average of the ratings that the $U_N$ closest users to u give to item i. Consider now $x_{(2)}^i = B^2 x^i$. This signal can be also expressed as $x_{(2)}^i = B x_{(1)}^i$. The uth entry of this signal represents now the average of the ratings $x_{(1)}^i$ from the $U_N$ users closest to u. Suppose that u' is one of those $U_N$ closest users to u, then the two following facts are true: 1) the value of $[x_i^{(2)}]_u$ depends on $[x_i^{(1)}]_{u'}$; and 2) the value of $[x_{(1)}^i]_{u'}$ depends on the ratings of the $U_N$ users who are closest to u', not to u. In other words, the information in $[x_{(2)}^i]_u$ depends on the two-hop neighbors (neighbors of neighbors) of u. The two-hop neighbors of u send their information to the one-hop neighbors of u, who aggregate this information and then forward it to u. This way the sparsity in the computations is preserved. Another advantage is that this scheme is amenable to a distributed implementation.

Clearly, one can consider further away neighbors, giving rise to the signals $x_{(3)}^i, x_{(4)}^i, \ldots$. Since the size of the L-hop neighborhood grows exponentially with L, most real-world networks have a diameter of 4-7, so that the number of shifts required to collect information from the entire network is typically small.

Once $x_{(1)}^i, x_{(2)}^i, \ldots, x_{(L)}^i$ are available, the prediction algorithm must learn how to combine them to form the final prediction. This is done using a simple linear predictor with L scalar filter coefficients $[h_1, h_2, \ldots, h_L]$ giving rise to $$\hat{x}^i = \sum_{l=1}^{L} h_l x_{(l)}^i = \sum_{l=1}^{L} h_l B^l \overline{x}^i, \qquad (1)$$

which is in fact equivalent to the application of a FIR graph filter of order L to the known ratings [3], [4].

1) Remark: One-Dimensional Multi-Hop Item-Based Schemes

Upon defining $C \in \mathbb{R}^{I \times I}$ as a sparse matrix that takes into account the strongest similarities among items, an alternative scheme can be built considering the ratings that a particular user u gave to the items that are in the L-hop neighborhood of the desired item i. With $x_u = [X_{u,1}, \ldots, X_{u,I}]$ collecting the ratings by user u, the estimated ratings from the known ratings $\bar{x}_u$ can be found via $$\hat{x}_u = \sum_{l=1}^{L} h_l C^l \bar{x}_u. \quad (2)$$

B. Two-Dimensional Multi-Hop Neighborhoods

While considering information from users who are not one-hop neighbors in a computationally efficient manner is important, it is even more important to exploit jointly correlations across users and items.

Start by recalling that we can see the rating matrix X as both a collection of item signals $X = [x^1, x^2, \ldots, x^I]$ as well as a collection of user signals $X^T = [x_1, x_2, \ldots, x_U]$. Recall also that $B \in \mathbb{R}^{U \times U}$ is a sparse matrix that takes into account the strongest similarities among users and $C \in \mathbb{R}^{I \times I}$ does the same among items. Then, with this definitions it holds that:

$X_{u,(L_u)} = B^{L_u} X$ will take averages among $L_U$-hop users for all items; and $X_{I,(L_u)}^T = C^{L_x} X^T$ will take averages among $L_I$-hop items across all users.

More interestingly, the products of the form
$B^{L_u} X C^{L_x}$
will take into account similarities among both users and items.

To focus on the advantages of the two-dimensional approach, consider the case of $L_U = L_I = 1$ so that we have $\hat{X} = B \bar{X} C$. The UI entries in $\hat{X}$ are formed by taking into account correlations (similarities) both across users and items. Forming $\hat{X}_u = BX$ requires $U_N UI$ computations ($U_N$ per user and item) and forming $\hat{X} = \hat{X} X_u XC$ requires $U_N UI$ computations ($I_N$ per user and item). As a result, $U_N + I_N$ computations per user-item pair are required. This contrasts with the original optimum algorithm described above which requires UI per item to fully account for the correlations among user-item pairs.

Clearly, to improve estimation accuracy and consider information beyond the one-hop neighborhood, we can consider prediction schemes of the form $$\hat{X} = \left( \sum_{l=0}^{L} h_l B^l \right) \bar{X} \left( \sum_{q=0}^{Q} g_q C^q \right). \quad (3)$$

The scheme above corresponds to our mirror filter in [5]. The complexity for the mirror-based predictor will be in the order of $(L+1)U_N + (Q+1)I_N$. Since UN is 1-2 orders of magnitude smaller than U, the same is true for IN, and both L and Q are small (no greater than 4-7), then the overall complexity is 1-3 orders of magnitude smaller than that of the optimum algorithm. Suppose $U_N = 0.03U$; $I_N = 0.03I$; $L = Q = 4$, the overall complexity is only 1:44% of the optimal algorithm, an improvement of 99:56%. Note that the benefits of implementing two-dimensional graph filters using Kronecker structures as the one in (3) was pointed out in [6].

Finally recall that on top of being computationally efficient (especially when the order of the filter is small) another well-known advantage of graph filters is that they are amenable to distributed implementation [3], [4].

REFERENCES

The disclosure of each of the following references is hereby incorporated by reference in its entirety.

[1] F. Ricci, L. Rokach, and B. Shapira, Introduction To Recommender Systems Handbook. Springer, 2011.

[2] Y. Koren, R. Bell, and C. Volinsky, "Matrix factorization techniques for recommender systems," Computer, vol. 42, no. 8, pp. 30-37, August 2009.

[3] A. Sandryhaila and J. Moura, "Discrete signal processing on graphs: Frequency analysis," IEEE Trans. Signal Process., vol. 62, no. 12, pp. 3042-3054, June 2014.

[4] S. Segarra, A. G. Marques, and A. Ribeiro, "Optimal graph-filter design and applications to distributed linear network operators," IEEE Trans. Signal Process., vol. 65, no. 15, pp. 4117-4131, August 2017.

[5] W. Huang, A. G. Marques, and A. Ribeiro, "Rating prediction via graph signal processing," (Technical report, to be submitted), 2017.

[6] A. Sandryhaila and J. M. Moura, "Big data analysis with signal processing on graphs: Representation and processing of massive data sets with irregular structure," IEEE Signal Processing Magazine, vol. 31, no. 5, pp. 80-90, 2014.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for computing user rating predictions, the system comprising:
   at least one processor;
   memory storing executable instructions for the at least one processor; and
   a recommender, implemented on the at least one processor and memory, and programmed for implementing a recommender system using graph signal processing, wherein implementing the recommender system using graph signal processing includes:
   during a training phase, determining a plurality of filter coefficients for a graph filter from a training user-item dataset;
   after the training phase, receiving a request to select one or more recommended items for a first user from a plurality of unrated items that are unrated by the first user to the recommender;
   predicting ratings for the first user for a first unrated item of the unrated items by applying the graph filter utilizing the determined filter coefficients to user-item rating data, wherein the user-item rating data comprises a plurality of ratings by the first user of the unrated items other than the first unrated item, a plurality of ratings by users other than the first user of the first unrated item, wherein applying the graph filter includes estimating a user relationship which quantifies similarity between tastes any two users for all items in the user-item rating data, estimating an item relationship which quantifies similarity between the any two items based on ratings from all users in the user-item rating data, and applying a transformation via at least one of the user relationship and the item relationship upon the user-item rating data, wherein the transformation weighs, based on the user relationship and the item relationship, the ratings that the users who, according to the user relationship, are similar and dissimilar to the first user gave to the items that, according to the item relationship, are similar and dissimilar to the first unrated item; and selecting the one or more recommended items from the unrated items using the user rating predictions for the unrated items and outputting the recommended items in response to the request.

2. The system of claim 1, wherein predicting the ratings comprises constructing a similarity network from the user-item rating data.

3. The system of claim 2, wherein the similarity network is a user similarity network comprising user similarity scores for each pair of users in the user-item rating data.

4. The system of claim 2, wherein the similarity network is an item similarity network comprising item similarity scores for each pair of items in the user-item rating data.

5. The system of claim 2, wherein applying the graph filter to the user-item rating data comprises using the similarity network for aggregating information from a subset of the user-item rating data.

6. The system of claim 2, wherein applying the graph filter comprises applying a band-stop graph filter to the similarity network and the band-stop graph filter operates in a frequency domain of a spectrum of the user-item rating data.

7. The system of claim 6, wherein the band-stop graph filter is a higher order graph filter comprising a plurality of filter coefficients selected so that computing user rating predictions accounts for one or more chains of users having determined similar ratings.

8. The system of claim 1, wherein predicting the ratings comprises modelling a rating user-item function by identifying a plurality of latent factors and characterizing the users and items in the user-item data using the latent factors.

9. The system of claim 1, wherein outputting the recommended items comprises displaying, on a display screen to the user, a visual representation of each of the recommended items.

10. A method for computing user rating predictions, the method comprising:
at a recommender implemented on at least one processor and memory storing executable instructions for the processor:
implementing a recommender system using graph signal processing, wherein implementing the recommender system using graph signal processing includes:
during a training phase, determining a plurality of filter coefficients for a graph filter from a training user-item dataset;
after the training phase, receiving a request to select one or more recommended items for a user from a plurality of unrated items that are unrated by the user to the recommender;
predicting ratings for the first user for each of the unrated items by applying the graph filter utilizing the determined filter coefficients to user-item rating data, wherein the user-item rating data comprises a plurality of ratings by the first user of the unrated items other than a first item, a plurality of ratings by users other than the first user of the first item, wherein applying the graph filter includes estimating a user relationship which quantifies similarity between tastes any two users for all items in the user-item rating data, estimating an item relationship which quantifies similarity between the any two items based on ratings from all users in the user-item rating data, and applying a transformation via at least one of the user relationship and the item relationship upon the user-item rating data, wherein the transformation weighs, based on the user relationship and the item relationship, the ratings that the users who, according to the user relationship, are similar and dissimilar to the first user gave to the items that, according to the item relationship, are similar and dissimilar to the first unrated item; and selecting the one or more recommended items from the unrated items using the user rating predictions for the unrated items and outputting the recommended items in response to the request.

11. The method of claim 10, wherein predicting the ratings comprises constructing a similarity network from the user-item rating data.

12. The method of claim 11, wherein the similarity network is a user similarity network comprising user similarity scores for each pair of users in the user-item rating data.

13. The method of claim 11, wherein the similarity network is an item similarity network comprising item similarity scores for each pair of items in the user-item rating data.

14. The method of claim 11, wherein applying the graph filter to the user-item rating data comprises using the similarity network for aggregating information from a subset of the user-item rating data.

15. The method of claim 11, wherein applying the graph filter comprises applying a band-stop graph filter to the similarity network and the band-stop graph filter operates in a frequency domain of a spectrum of the user-item rating data.

16. The method of claim 15, wherein the band-stop graph filter is a higher order graph filter comprising a plurality of filter coefficients selected so that computing user rating predictions accounts for one or more chains of users having determined similar ratings.

17. The method of claim 10, wherein predicting the ratings comprises modelling a rating user-item function by identifying a plurality of latent factors and characterizing the users and items in the user-item data using the latent factors.

18. The method of claim 10, wherein outputting the recommended items comprises displaying, on a display screen to the user, a visual representation of each of the recommended items.

19. A non-transitory computer readable medium having stored thereon executable instructions that when executed by at least one processor of a computer cause the computer to perform steps comprising:
at a recommender implemented on at least one processor and memory storing executable instructions for the processor:
implementing a recommender system using graph signal processing, wherein implementing the recommender system using graph signal processing includes:
during a training phase, determining a plurality of filter coefficients for a graph filter from a training user-item dataset;

after the training phase, receiving a request to select one or more recommended items for a user from a plurality of unrated items that are unrated by the user to the recommender;

predicting ratings for the first user for each of the unrated items by applying the graph filter utilizing the determined coefficients to user-item rating data, wherein the user-item rating data comprises a plurality of ratings by the first user of the unrated items other than a first item, a plurality of ratings by users other than the first user of the first item, wherein applying the graph filter includes estimating a user relationship which quantifies similarity between tastes any two users for all items in the user-item rating data, estimating an item relationship which quantifies similarity between the any two items based on ratings from all users in the user-item rating data, and applying a transformation via at least one of the user relationship and the item relationship upon the user-item rating data, wherein the transformation weighs, based on the user relationship and the item relationship, the ratings that the users who, according to the user relationship, are similar and dissimilar to the first user gave to the items that, according to the item relationship, are similar and dissimilar to the first unrated item; and selecting the one or more recommended items from the unrated items using the user rating predictions for the unrated items and outputting the recommended items in response to the request.

\* \* \* \* \*